United States Patent
Loheide et al.

(10) Patent No.: US 11,109,102 B2
(45) Date of Patent: *Aug. 31, 2021

(54) DYNAMIC VERIFICATION OF PLAYBACK OF MEDIA ASSETS AT CLIENT DEVICE

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory McClain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,775

(22) Filed: Jun. 16, 2020

(65) Prior Publication Data
US 2020/0314494 A1    Oct. 1, 2020

Related U.S. Application Data

(63) Continuation of application No. 15/988,241, filed on May 24, 2018.
(Continued)

(51) Int. Cl.
*H04N 21/44*     (2011.01)
*H04N 21/266*    (2011.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
None
See application file for complete search history.

(56) References Cited

U.S. PATENT DOCUMENTS 6,378,129 B1    4/2002    Zetts
6,434,621 B1    8/2002    Pezzillo et al.
(Continued)

OTHER PUBLICATIONS

Advisory Action for U.S. Appl. No. 15/396,475 dated Jun. 3, 2019.
(Continued)

*Primary Examiner* — Junior O Mendoza
(74) *Attorney, Agent, or Firm* — Chip Law Group

(57) ABSTRACT

A media presentation and distribution system includes a verification server that handles dynamic verification of playback of media assets on a client device. The client device receives an asset stream of media assets that comprises one or more tags embedded in the media assets. The client device detects an asset identifier associated with each of the media assets during playback of each media asset on the client device, based on identification of a tag of the one or more tags. The verification server verifies the playback of the media assets on the client device based on received support information from the client device. The playback of the media assets are verified to satisfy defined asset delivery criteria and to identify and debug a deviation or one or more errors with the playback of the media assets.

20 Claims, 8 Drawing Sheets

Related U.S. Application Data

(60) Provisional application No. 62/511,190, filed on May 25, 2017.

(51) Int. Cl.

| | | |
|---|---|---|
| *H04N 21/24* | (2011.01) | |
| *H04N 21/458* | (2011.01) | |
| *H04L 29/08* | (2006.01) | |
| *H04N 21/431* | (2011.01) | |
| *H04N 21/81* | (2011.01) | |
| *G06Q 30/02* | (2012.01) | |
| *H04L 29/06* | (2006.01) | |
| *H04N 21/478* | (2011.01) | |
| *H04N 21/233* | (2011.01) | |
| *H04N 21/234* | (2011.01) | |
| *H04N 21/2387* | (2011.01) | |
| *H04N 21/2389* | (2011.01) | |
| *H04N 21/8545* | (2011.01) | |
| *G06Q 30/06* | (2012.01) | |
| *H04N 21/2543* | (2011.01) | |
| *H04N 21/845* | (2011.01) | |
| *H04N 21/235* | (2011.01) | |
| *H04N 21/258* | (2011.01) | |
| *H04N 21/435* | (2011.01) | |
| *H04N 21/6332* | (2011.01) | |
| *H04N 21/84* | (2011.01) | |
| *H04N 21/239* | (2011.01) | |
| *H04N 21/262* | (2011.01) | |
| *H04N 21/2668* | (2011.01) | |
| *H04N 21/6587* | (2011.01) | |
| *H04L 9/32* | (2006.01) | |
| *H04N 21/472* | (2011.01) | |
| *H04N 21/835* | (2011.01) | |
| *H04H 20/10* | (2008.01) | |
| *H04N 21/8358* | (2011.01) | |

(52) U.S. Cl.
CPC ..... *G06Q 30/0275* (2013.01); *G06Q 30/0633* (2013.01); *H04L 9/32* (2013.01); *H04L 65/4084* (2013.01); *H04L 65/60* (2013.01); *H04L 67/1097* (2013.01); *H04L 67/125* (2013.01); *H04L 67/16* (2013.01); *H04L 67/306* (2013.01); *H04L 67/32* (2013.01); *H04L 67/42* (2013.01); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(56) References Cited

U.S. PATENT DOCUMENTS

| | | |
|---|---|---|
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B1 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 8,954,521 B1 | 2/2015 | Faaborg et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,390,447 B1 | 7/2016 | Smith |
| 10,075,753 B2 | 9/2018 | Loheide et al. |
| 2002/0038457 A1 | 3/2002 | Numata et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2004/0172650 A1 | 9/2004 | Hawkins et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1* | 6/2005 | Brandenburg .......... G06F 21/10 380/43 |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0186228 A1* | 8/2007 | Ramaswamy ... H04N 21/42201 725/14 |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0254934 A1 | 10/2009 | Grammens |
| 2009/0256972 A1* | 10/2009 | Ramaswamy ......... H04H 60/37 348/738 |
| 2010/0010899 A1 | 1/2010 | Lambert et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |

(56) References Cited

U.S. PATENT DOCUMENTS

| | | |
|---|---|---|
| 2011/0052144 A1 | 3/2011 | Abbas et al. |
| 2011/0123062 A1* | 5/2011 | Hilu .................. G06Q 30/02 382/100 |
| 2011/0153464 A1 | 6/2011 | Hendricks et al. |
| 2011/0164115 A1 | 7/2011 | Bennett et al. |
| 2011/0238754 A1 | 9/2011 | Dasilva et al. |
| 2011/0246202 A1 | 10/2011 | McMillan et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0150290 A1 | 5/2016 | Chandler et al. |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099506 A1 | 4/2017 | Grover |
| 2017/0099525 A1 | 4/2017 | Ray et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0289597 A1 | 10/2017 | Riedel et al. |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0300751 A1 | 10/2018 | Hammitt et al. |
| 2018/0343505 A1* | 11/2018 | Loheide .......... H04N 21/25891 |
| 2020/0244778 A1 | 7/2020 | Berookhim et al. |

OTHER PUBLICATIONS

Advisory Action for U.S. Appl. No. 15/988,308 dated Jul. 16, 2019.
Advisory Action for U.S. Appl. No. 15/396,468 dated Jan. 16, 2020.
Advisory Action for U.S. Appl. No. 15/396,614 dated Oct. 24, 2019.
Advisory Action for U.S. Appl. No. 15/986,218 dated Jul. 12, 2019.
Advisory Action for U.S. Appl. No. 15/986,361 dated Feb. 26, 2020.
Advisory Action for U.S. Appl. No. 15/986,451 dated Feb. 20, 2020.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar 16, 2018.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance for U.S. Appl. No. 15/396,624 dated Sep. 5, 2019.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Corrected Notice of Allowance in U.S. Appl. No. 15/396,453 dated Jun. 13, 2019.
Final Office Action for U.S. Appl. No. 15/986,218 dated Apr. 24, 2019.
Final Office Action for U.S. Appl. No. 15/988,308 dated May 9, 2019.
Final Office Action for U.S. Appl. No. 15/396,468 dated Nov. 6, 2019.
Final Office Action for U.S. Appl. No. 15/396,475 dated Feb. 4, 2020.
Final Office Action for U.S. Appl. No. 15/396,614 dated Aug. 12, 2019.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.

(56) References Cited

OTHER PUBLICATIONS

Final Office Action in U.S. Appl. No. 15/396,614 dated Oct. 25, 2018.
Final Office Action in U.S. Appl. No. 15/986,218 dated Apr. 24, 2019.
Final Office Action in U.S. Appl. No. 15/396,624 dated Jan. 24, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Non-Final Office Action for U.S. Appl. No. 15/396,468 dated Feb. 4, 2020.
Non-Final Office Action for U.S. Appl. No. 15/396,475 dated Aug. 6, 2020.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,406 dated Dec. 18, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,308 dated Sep. 8, 2020.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 15/988,492 dated Sep. 10, 2020.
Non-Final Office Action for U.S. Appl. No. 16/128,104 dated Aug. 21, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/396,624 dated May 31, 2019.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 15/988,241 dated Mar. 18, 2020.
Notice of Allowance for U.S. Appl. No. 16/128,104 dated Dec. 12, 2019.
Notice of Allowance for U.S. Appl. No. 16/230,268 dated Aug. 24, 2020.
Notice of Allowance for U.S. Appl. No. 16/234,870 dated Aug. 19, 2020.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Restriction Requirement for U.S. Appl. No. 16/231,467 dated Feb. 5, 2020.
Supplemental Notice of Allowance for U.S. Appl. No. 15/396,624 dated Aug. 14, 2019.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Notice of Allowability for U.S. Appl. No. 15/986,361 dated Sep. 30, 2020.
Notice of Allowance for U.S. Appl. No. 16/229,310 dated Dec. 14, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/235,445 dated Mar. 26, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Non-Final Office Action for U.S. Appl. No. 16/854,970 dated Mar. 17, 2021.
Notice of Allowance for U.S. Appl. No. 15/396,475 dated Feb. 5, 2021.

(56) References Cited

OTHER PUBLICATIONS

Notice of Allowance for U.S. Appl. No. 15/986,406 dated Mar. 3, 2021.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Supplemental Notice of Allowance for U.S. Appl. No. 15/986,218 dated Jan. 27, 2021.
Corrected Notice of Allowance for U.S. Appl. No. 16/236,713 dated Apr. 8, 2021.
Non-Final Office Action for U.S. Appl. No. 15/988,492 dated Apr. 14, 2021.
Supplemental Notice of Allowance for U.S. Appl. No. 15/986,406 dated Apr. 7, 2021.
Corrected Notice of Allowance for U.S. Appl. No. 15/986,286 dated May 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/236,713 dated May 17, 2021.
Final Office Action for U.S. Appl. No. 15/988,572 dated May 12, 2021.
Non-Final Office Action for U.S. Appl. No. 15/396,468 dated Jun. 1, 2021.
Notice of Allowance for U.S. Appl. No. 15/986,451 dated May 5, 2021.
Corrected Notice of Allowability for U.S. Appl. No. 16/230,493 dated Jul. 8, 2021.
Corrected Notice of Allowability for U.S. Appl. No. 16/229,614 dated Jul. 29, 2021.
Non-Final Office Action for U.S. Appl. No. 17/038,323 dated Jul. 1, 2021.

\* cited by examiner

DYNAMIC VERIFICATION OF PLAYBACK OF MEDIA ASSETS AT CLIENT DEVICE

CROSS-REFERENCE TO RELATED APPLICATION/INCORPORATION BY REFERENCE

This patent application makes reference to, claims priority to, claims the benefit of, and is a Continuation application of U.S. patent application Ser. No. 15/988,241, filed May 24, 2018, which claims priority to U.S. Provisional Application Ser. No. 62/511,190, which was filed on May 25, 2017, and is hereby incorporated herein by reference in its entirety.

This application also makes reference to:
U.S. application Ser. No. 15/986,218, filed on May 22, 2018;
U.S. application Ser. No. 15/986,361, filed on May 22, 2018; and
U.S. application Ser. No. 15/986,406, filed on May 22, 2018.

Each of the above referenced application is hereby incorporated herein by reference in its entirety.

FIELD OF TECHNOLOGY

Certain embodiments of the present disclosure relate to television and broadcasting technologies for streaming media networks. More specifically, certain embodiments of the present disclosure relate to dynamic verification of playback of media assets at different client devices.

BACKGROUND

Recent advancements in the television and broadcasting industry has led to development of various communication technologies and broadcasting platforms. Such communication technologies and broadcasting platforms are revolutionizing the way channel content is generated and presented to users. Currently, there is massive competition amongst the broadcasting platforms that are striving to increase their visual appeal in order to gain wider audience. The television viewing market is no longer exclusively concerned that whether channel content is viewed on a dedicated television or another device capable of playing channel content. Due to penetration of new technologies in the television and broadcasting sector, it is evident that the success of television broadcasting will be dependent on the ability of the network provider to gain access to the channel content demanded by the users, and to differentiate their offering from that of incumbent broadcasters or find new modes of content delivery.

Increased competition has led the broadcast providers (or the network providers) to differentiate their offering and provide services that may concurrently handle multiple channels. However, this has resulted in unparalleled levels of system complexity at the hardware systems of the broadcast providers, which requires installation of large infrastructures and resources to handle and maintain uninterrupted content delivery for existing channel and also meet the ever increasing demand for content. Therefore, an advanced system may be required that facilitates the client-side device to present as well as verify the playback and adjust the deviation encountered during verification with the capability to provide enhanced viewer experience, thereby increasing their appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and methods are provided for dynamic verification of playback of media assets at client device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the present disclosure may be found in a method and system for dynamic verification of playback of media assets at client device. Examples of the media assets may include, but are not limited to, programming or non-programming graphics, programming or non-programming videos, or programming or non-programming audio, and overlay graphics, such as logos, tickers, bugs, banners, popups, lower third graphics (also referred to as $\frac{1}{3}^{rd}$ graphics), and sliders. As media content is personalized for a user associated with a client device, it is difficult to verify playback (or presentation) of different media assets, at defined on-screen positions and time-intervals, during the playback of the programming media content. Additionally, there is a need to measure deviations or errors with respect to a defined asset delivery criteria associated with the playback of the media assets at the client device. The defined asset delivery criteria may include, but are not limited to, a verification of at least a display time, a display duration, a display frequency, and a specified slot within a specified program of programming media content. The deviations or errors with the playback of the one or more media assets may include, but are not limited to, a partial overlay, a color imbalance, an error with transition or overlay, an abrupt disappearance of the one or more media assets from the display view, and a non-responsive playback of the one or more media assets. The present disclosure provides a way to verify the playback of the one or more assets, presented onto a display view of a client device while minimally impacting the power consumption, battery usage, or affecting the availability of resources for other processes on the client device. Advantageously, as the verification may robustly and dynamically detect as well as identify deviations or errors associated with the playback of the media assets, the detected deviations or errors may be corrected in near real time at the client device.

Figure 1:
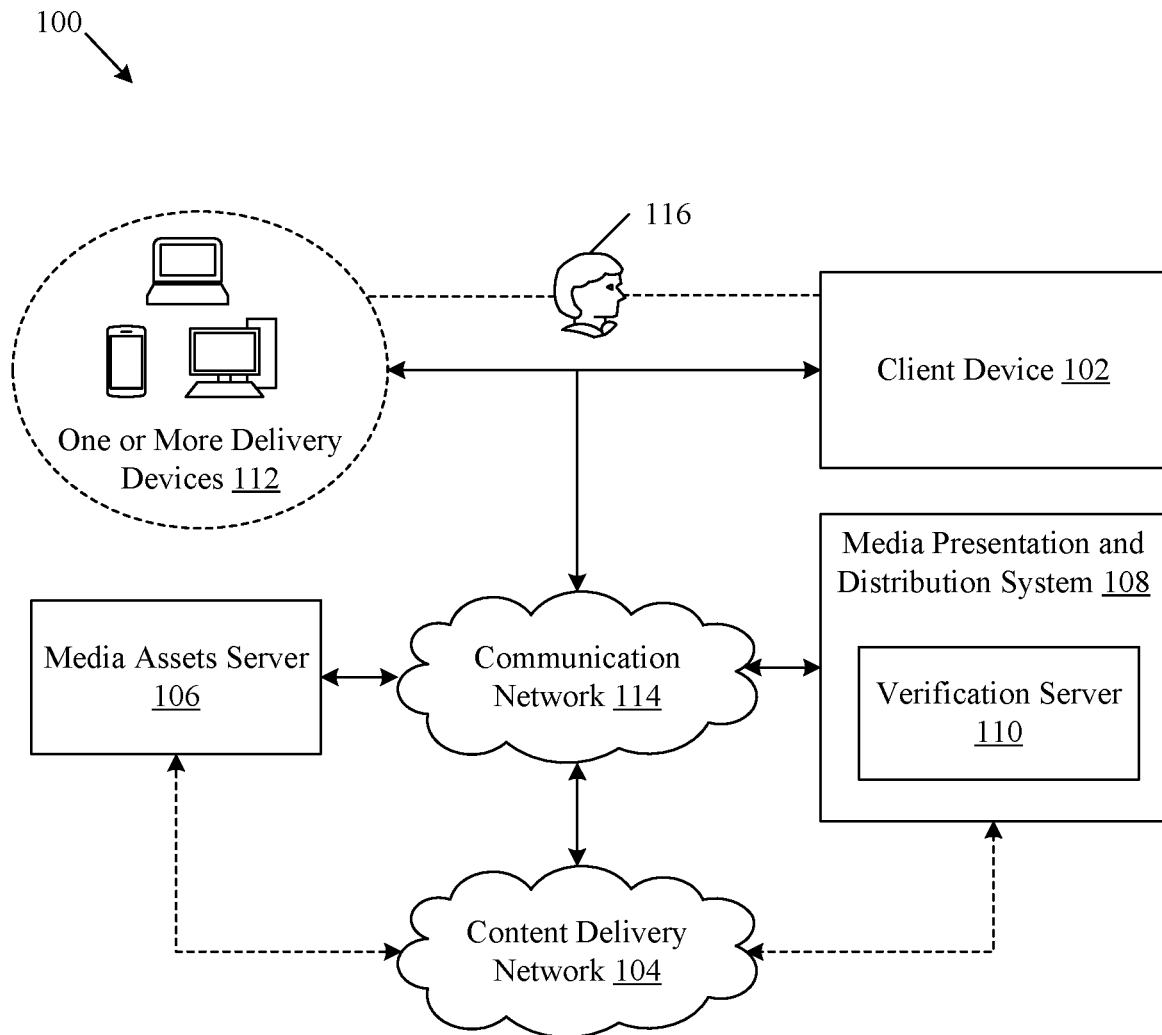
FIG. 1 is a block diagram that illustrates an exemplary network environment for verification of playback of media assets at the client device, in accordance with various exemplary embodiments of the present disclosure.

FIG. 1 is a block diagram that illustrates an exemplary network environment for verification of playback of media assets at a client device, in accordance with various exemplary embodiments of the present disclosure. In FIG. 1, there is shown a network environment 100 that comprises a client device 102, a content delivery network (CDN) 104, a media assets server 106, a media presentation and distribution system 108, and one or more delivery devices 112, communicably coupled to a communication network 114. Additionally, FIG. 1 illustrates a user 116 associated with the client device 102 and the one or more delivery devices 112. There is also shown a verification server 110. In some embodiments of the disclosure, the verification server 110 may be a part of the media presentation and distribution system 108. In other embodiments of the disclosure, the verification server 110 may be separate from the media presentation and distribution system 108.

The client device 102 may comprise suitable logic, circuitry, and interfaces that may be configured to execute operations that pertain to the playback (or presentation) of one or more media assets (programming and/or non-programming) onto a display view of the client device 102. Examples of the media assets may include, but are not limited to, programming or non-programming graphics, programming or non-programming videos, or programming or non-programming audio, and overlay graphics, such as logos, tickers, bugs, banners, popups, lower third graphics (also referred to as ⅓rd graphics), and sliders. The client device 102 may also facilitate playback of the one or more media assets along with the programming media content via a display device, such as a television, a laptop, or a desktop, which may be a peripheral device or may be integrated with the client device 102. Examples of the client device 102 may include, but are not limited to, a Set-Top-Box (STB), an IPTV, a hybrid box, a cable converter, a smartphone, a laptop, and a tablet.

The client device 102 may be associated with a device identifier that may be a unique identifier for the user 116 associated with client device 102. Such device identifier may be used by the media presentation and distribution system 108 to discretely personalize delivery of the programming media content and/or the one or more media assets at the client device 102. Examples of such device identifier may include, but are not limited to, an International Mobile Equipment Identity (IMEI) number, Android ID, Apple ID, Advertising Identifier (IDFA), Advertising Identifier (AID), Unique Device Identifier (UDID), mobile number, and MacID. An electronic program guide (EPG) may be enabled on the client device 102 to facilitate the user 116 to switch to different programming media content in accordance with a specified user-preference. The client device 102 may receive the media (or asset) stream of the programming media content and/or the one or more media assets, via a distribution channel. Examples of the distribution channel may include, but are not limited to, satellite broadcast, cable distribution, an IPTV network, and digital terrestrial television network.

The CDN 104 may comprise suitable logic, circuitry, and interfaces that may be configured to store one or more segments of the programming media content and distribute the stored one or more segments of the programming media content to the media presentation and distribution system 108. Accordingly, the CDN 104 may be configured to facilitate delivery of one or more programs as the programming media content to a plurality of users, such as the user 116. The CDN 104 may serve as a distributed network of media servers, which may serve as a curated repository of programs (encoded or uncompressed). The curated repository of programs may be used for distribution to the media presentation and distribution system 108. The CDN 104 may be configured to distribute the one or more segments of the programming media content, via one or more media access platforms (such as broadcast, live and IP-based platforms) to the media presentation and distribution system 108. The CDN 104 may manage resources for a delivery channel that may be characterized by a frequency band for a broadcast delivery channel or an internet protocol address (IP address) for an IP-based delivery channel. Examples of the delivery channel may include, but are not limited to, a television channel, a radio channel, a webcasting channel, a social webcasting, and an IP-based channel that may be hosted on a webpage or an application.

The one or more media access platforms may include a Video-On-Demand (VOD) platform that may be distributed via at least an over-the-air content delivery/distribution network, a linear content delivery/distribution network, a cable content delivery/distribution network, a satellite content delivery/distribution network, an Internet Protocol (IP) based content delivery/distribution network, and/or the like. The CDN 104 may comprise a distributed and networked chain of one or more media servers, media packagers, media asset managers, media ingesters, encoder/decoders, processing engines, schedulers, and subscription management and payment systems.

The media assets server 106 may comprise suitable logic, circuitry, and interfaces that may be configured to store the one or more media assets, such as programming/non-programming content, overlay graphics of advertisements, logos, bugs, and promos. The media assets server 106 may additionally serve the stored one or more media assets to the media presentation and distribution system 108. The one or more media assets may be selected by the media presentation and distribution system 108 to personalize the delivery of the one or more media assets and the programming media content for the user 116. The media assets server 106 may also store an attribute database of the one or more media assets. The media assets server 106 may serve the one or more media assets to a media packager or an asset store within the media presentation and distribution system 108. The one or more media assets may be provided in accordance with measured and/or estimated preferences of the user 116, context of the one or more segments of the programming media content, or a demographic criteria (for example, age, gender and region).

Records of the one or more media assets to be presented at the client device 102 may be managed for linear pre-scheduled media streams as well as the VOD media streams. The media assets server 106 may be part of a media asset network that may be associated with one or more media asset promoters, such as advertisers, or media asset owners. A repository of the one or more media assets may be managed by the media assets server 106. In such management, each media asset may correspond to a promotional content for an offering, such as a product offering or a service offering. Each of the one or more media assets in the media stream may be associated with at least an identifier, playback start time, playback end time, a media asset format, a file size, a resolution, and a codec. In accordance with an embodiment, each media asset may be characterized as a promotional advertisement and the corresponding identifier may be an advertisement identifier (Ad-ID).

In accordance with an embodiment, each media asset may be characterized as promotional content and the corresponding identifier may be a web, image or audio-based beacon that may be present with the corresponding media asset. The one or more media assets may correspond to the promotional content that comprises at least one of a graphic asset, a textual asset, an audio asset, a video asset, and an animated asset. The one or more operations of the media assets server 106 may be shared or managed by the CDN 104 or the media presentation and distribution system 108, without deviation from the scope of the present disclosure.

The media presentation and distribution system 108 may comprise suitable, logic, circuitry, and interfaces that may be configured to manage operations of the client device 102 to verify the presentation of the one or more media assets encoded with the programming media content, requested by the user 116. The media presentation and distribution system 108 may be configured to receive requests for delivery of media content (programming or non-programming) from different client devices (e.g., the client device 102). In response to the request, the media presentation and distribution system 108 may be further configured to deliver the programming media content that matches the one or more user-preferences to the client device 102.

The media presentation and distribution system 108 may serve an asset and/or a media stream to the client device 102, via a distribution service. The distribution service may be at least one of a unicast, multicast, broadcast, or simulcast service. An encoder at the media presentation and distribution system 108 may encode the media stream using an adaptive when bitrate streaming (ABR) technique in accordance with an availability of network bandwidth for the client device 102. Examples of the ABR technique may include, but are not limited to, HTTP Dynamic Streaming (HDS), Dynamic Adaptive Streaming Over HTTP (DASH), "Smooth", "Progressive" and "HTTP Live Streaming" (HLS) streaming techniques. The operations of the media presentation and distribution system 108 may be shared with the CDN 104 of the network environment 100, without deviation from the scope of the present disclosure.

The verification server 110 (VS) 110 may comprise suitable logic, circuitry, and interfaces that may be configured to verify the playback (or presentation) of the one or more media assets on the display view of the client device 102. Additionally, the display view of the client device 102 may be configured for one or more modifications, such as display partitioning, transitions, pip, focus, zoom, and scaling. Therefore, the verification server 110 may be configured to verify an enablement of one or more modifications at the display view of the client device 102 and the corresponding presentation of the one or more media assets in the modified display view of the client device 102. Although the verification server 110 is illustrated as a part of the media presentation and distribution system 108, it should be readily understood that the disclosure is not limited in this regard. Accordingly, in some embodiments of the disclosure, the verification server 110 may be separate from the media presentation and distribution system 108.

The one or more delivery devices 112 may comprise suitable logic, circuitry, and interfaces that may be configured to receive and/or serve one or more notifications or promotional content, via one or more delivery platforms accessible on the one or more delivery devices 112. The one or more delivery platforms may correspond to a communication exchange platform that may incorporate visual, audible, or executable data to provide one or more notifications or associated promotional content to the user 116. Example of the one or more delivery platforms may include, but are not limited to, an e-mail, a mobile messaging, a webpage, a podcast, and a push notification. The promotional content or the one or more notifications may be received at the one or more delivery platforms on the one or more delivery devices 112. Such receipt may occur to notify the user 116 about engagements with the programming media content and the presented one or more media assets.

The promotional content may comprise one or more promotional items, each of which may correspond to an advertisement for a product, service, cause or the programming media content. The promotional content may be present in one or more formats. The one or more formats of the promotional content may be present to suitably target each of the one or more delivery platforms. Examples of the one or more formats may include, but are not limited to, a video format, an audio format, a text format, an image format, or a suitable programmable or non-programmable format. The promotional content may correspond to an interactive selectable item such that each selection may be recorded as part of a select stream for the corresponding user 116. Additionally, views or intent to select may be recorded as impressions, page redirections, or commercial sale on a redirected page recorded in real-time.

The communication network 114 may comprise suitable logic, circuitry, and interfaces that may be configured to provide a plurality of network ports and a plurality of communication channels for transmission and reception of the communication data. The communication data may correspond to data received and/or exchanged, via the communication network 114, among the media presentation and distribution system 108, the CDN 104, the media assets server 106, and the client device 102. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 114 for implementation of communication protocols on one or more communication requests from at least one of the one or more computing devices.

The communication data may be transmitted or received via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT). The communication data may be transmitted or received via one or more communication channels of the plurality of communication channels. The communication channels may include, but are not limited to, a wireless channel, a wired channel, a combination of wireless and wired channel thereof. The wireless or wired channel may be associated with a data standard which may be defined by one of a Satellite Network, a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). The wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 114 may be based on a broadcast standard, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S.

In operation, the media presentation and distribution system 108 may be configured to prepare one or more media assets (programming and/or non-programming) for delivery to the client device 102. The one or more media assets may be prepared in response to a request (a user request or an automatic device/app request) that may be received from the client device 102. Examples of a media asset may include, but is not limited to, a programming video/audio, a promotional video/audio, a bug (i.e., a digital onscreen graphic), a logo, a banner, ⅓rd graphics, and tickers.

A tagging service may be enabled within the media presentation and distribution system 108 to insert one or more tags at an event opportunity point determined within the programming media content of the one or more programs. The TS 224 may be configured to generate and embed one or more tags in prepared one or more media assets (programming and/or non-programming). Alternatively stated, each tag may act as an asset identifier for a media asset and may be generated specifically for such media asset. Additionally, each tag may carry information associated with one or more regions for placement of a specific media asset and behavior and interactivity of the associated media asset at the display view of the client device 102. Each tag may be represented by at least one of a signal, a beacon, a SCTE-35 message, a marker, textual information, binary information, visual information, aural information in the asset stream, and the like.

The media presentation and distribution system 108 may be further configured to encapsulate the prepared one or more media assets on an asset stream of the one or more media assets. Alternatively stated, the media presentation and distribution system 108 may prepare the asset stream that encapsulates the prepared one or more media assets embedded with the one or more tags (and/or asset public keys). Along with the asset stream, in some cases, the media presentation and distribution system 108 may prepare the programming media content (e.g., television shows, trailers, programs, live shows, etc.) as a media stream (e.g., an MPEG-2 TS transport stream).

The client device 102 may be configured to receive an asset stream of one or more media assets that includes one or more tags embedded in the one or more media assets. The client device 102 may be further configured to detect an asset identifier associated with each media asset of the one or more media assets during playback of each media asset on the client device 102, based on identification of a tag of the one or more tags. At the playback time of the one or more media assets, the client device 102 may transmit a verification request to the verification server 110 on the media presentation and distribution system 108. The verification request may include different details associated with the playback of the one or more media assets at the playback time of the one or more media assets onto the display view of the client device 102. Therefore, the client device 102 may be further configured to generate support information (e.g., player screenshots, encrypted verification messages, etc.) for each media asset, in response to the detection of the asset identifier (as described in detail in FIG. 2). The support information may be generated for verification of the playback of each media asset at the client device 102.

At the media presentation and distribution system 108, the verification server 110 may be further configured to receive the support information in response to the detection of the asset identifier at the client device 102. Thereafter, the verification server 110 may be further configured to verify the playback of the one or more media assets on the client device 102 based on the received support information from the client device 102. The playback of the one or more media assets may be verified to satisfy a defined asset delivery criteria and to identify and debug at least one deviation or at least one error with the playback of the one or more media assets.

Figure 2:
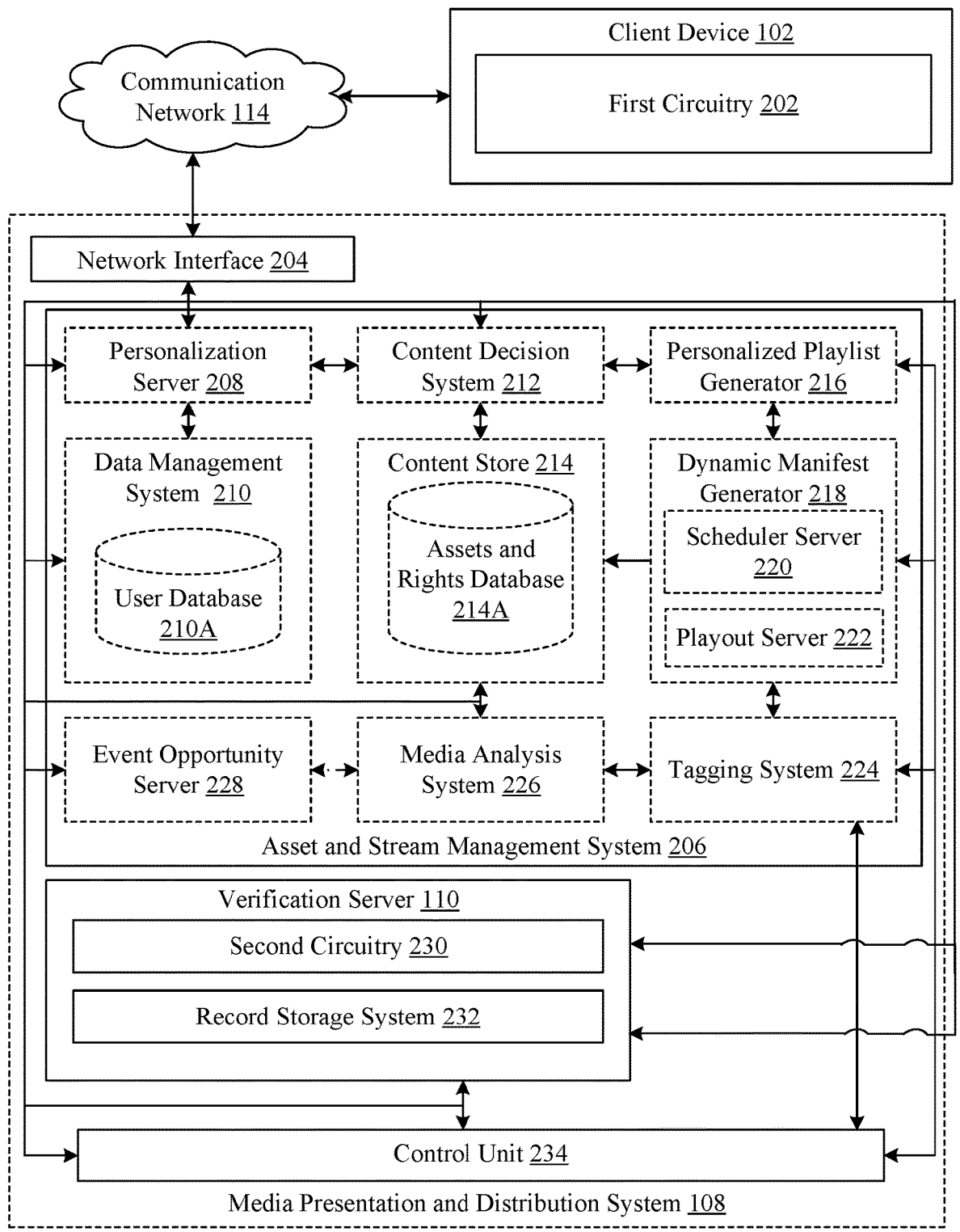
FIG. 2 is a block diagram that illustrates an exemplary media presentation and distribution system that handles server-side verification of playback of media assets at client device, in accordance with an embodiment of the present disclosure.

The verification may be done on the verification server 110, based on at least public/private key based verification, content recognition performed on the one or more media assets, client display representation-based server-side verification of the playback of the one or more media assets, and server-side virtual client based verification (as discussed in detail in FIG. 2). Also, the verification may also lead to an evaluation of one or more deviations associated with the unmodified display view or the modified display view of the client device 102. The verification server 110 may implement at least defined heuristic, machine learning, content recognition, or secured public/private key based verification methods, or other methods to verify the playback (or presentation) of the one or more media assets on the display view of the client device 102. Such verification methods may be used further to estimate the one or more deviations factored based on at least a placement, timing, a delay, a scale, and quality of the one or more media assets presented on the display view of the client device 102. The verification of the playback of the one or more media assets at the client device 102 may also reduce a response time to adjust the one or more deviations with the playback of the one or more media assets at the client device 102 with respect to a defined asset delivery criteria. The reduced response time may enhance user engagement with the presented one or more media assets at the playback time.

The defined asset delivery criteria may include, but are not limited to, a verification of at least a display time, a display duration, a display frequency, a specified slot within a specified program of programming media content, a number of user interactions with the verified one or more media assets, an enablement of one or more features at the playback time of the one or more media assets, a responsive display of the one or more media assets for one or more user interactions, and a specified modification in the display view for the corresponding one or more media assets. The one or more deviations with the playback of the one or more media assets may correspond to, but are not limited to, a partial overlay, a color imbalance, an error with transition or overlay, an abrupt disappearance of the one or more media assets from the display view, and a non-responsive playback of the one or more media assets. The detailed description of the operation of the client device 102 and the media presentation and distribution system 108 has been described in detail in FIG. 2.

FIG. 2 is a block diagram that illustrates an exemplary media presentation and distribution system that handles server-side verification of playback of media assets at client device of FIG. 2B, in accordance with an embodiment of the present disclosure. FIG. 2 is explained in conjunction with elements of FIG. 1. With reference to FIG. 2, there is shown a block diagram of a system 200 that includes the client device 102 and the media presentation and distribution system 108 communicatively coupled to the client device 102 via the communication network 114. The client device 102 may include a first circuitry 202, which may be configured to execute different operations associated with presentation (or playback) of media content (programming or non-programming) and media assets (programming or non-programming) onto a display (not shown in FIG. 2) associated (or integrated) with the client device 102. The media presentation and distribution system 108 may include a network interface 204 and an asset and stream management system 206. The asset and stream management system 206 may include a personalization server (PS) 208, a data management system (DMS) 210, a user database 210A, a content decision system (CDS) 212, a content store (CS) 214, an assets and rights database 214A, a personalized playlist generator (PPG) 216, a dynamic manifest generator 218, a scheduler server (SS) 220, a play-out server (PLS) 222, a tagging system (TS) 224, a media analysis server (MAS) 226, and an event opportunity server (EOS) 228. There is also shown the verification server 110 that includes a second circuitry 230 and a record storage system 232, and a control unit (CU) 234, communicably coupled with each other in the media presentation and distribution system 108.

The network interface 204 may comprise suitable logic, circuitry, and interfaces that may be configured to operate as a communication bridge between various component of the client device 102, the CDN 104, the media assets server 106, and the one or more delivery devices 112 associated with the user 116 and various computing components of the media presentation and distribution system 108. The network interface 204 may be implemented by use of known technologies to support wired or wireless communication of the various computing components of the media presentation and distribution system 108 with peripheral components, such as the client device 102, the CDN 104, the media assets server 106, and the one or more delivery devices 112 associated with the user 116. Additionally, the network interface 204 may operate as a switch or a router of communication signals to dedicated components of the media presentation and distribution system 108. Components of the network interface 204 may include, but are not limited to, an antenna, an RF transceiver, one or more amplifiers, a tuner, one or more oscillators, a digital signal processor, a CODEC chipset, and/or a local buffer.

The asset and stream management system 206 may comprise suitable logic, circuitry and interfaces that may be configured to prepare different (or combined) media streams of programming media content and media assets (i.e., overlay graphics, e.g., banners, ad bugs, channel bugs, promotions bugs, ⅓rd graphics, tickers, etc.). Also, the preparation of different (or combined) media streams may be done in accordance with at least one of user attributes (e.g., user preferences, demographic details (e.g., gender, age, locations, income, etc.), likes, dislikes, etc.), goals (defined by advertisers/content producers), constraints (device constraints, inventory constraints, time constraints, etc.), and the like.

The PS 208 may comprise suitable logic, circuitry and interfaces that may be configured to operate as a communication interface between the (client-side) client device 102 and the (server-side) DMS 210. The PS 208 may be specifically configured to communicate, via the network interface 204, with the client device 102 associated with the user 116, using communication signals. The one or more requests, from the client device 102, may be received at the network interface 204. The network interface 204 may be configured to route the received one or more requests to the PS 208. The PS 208 may be configured to parse one or more request parameters in each received request from the client device 102, and communicate the parsed one or more request parameters with the DMS 210 to form semantic relationship models among at least one of preferences, profile, likes, dislikes, location or demographic factors associated with the user 116 associated with the client device 102. The semantic relationship models may be statistical models of the one or more user-preferences of the user 116 associated with the client device 102 and may provide a better understanding of the user-behavior, preferences, attention, intent, and interest for requested one or more preferences of the programming media content. The PS 208 may be further associated with the CDS 212 and may communicate the parsed one or more request parameters to the CDS 212.

The DMS 210 may comprise suitable logic, circuitry and interfaces that may be configured to store, collate, and assimilate data, associate relationships within stored data of the user 116. The DMS 210 may specifically form a data cloud for the one or more user-preferences, likes, dislikes for the programming media content and the one or more media assets, demography, financial information, location, and the like. The DMS 210 may be further configured to generate deep or shallow semantic relationship models of the stored and assimilated data for the user 116. The data associated with the user 116 may be shared by the DMS 210 in response to requests from each component of the media presentation and distribution system 108.

The DMS 210 may comprise at least the user database 210A. The user database 210A may comprise suitable logic, circuitry and interfaces that may be configured to store and update records for the one or more preferences, likes, dislikes, demography, location, income or related data of the user 116 associated with the client device 102.

The CDS 212 may comprise suitable logic, circuitry and interfaces that may be configured to identify, from a curated repository of programs in the CS 214, an available one or more programs that may match the one or more request parameters from the client device 102 associated with the user 116. The CDS 212 may further perform ranking of the identified one or more programs for the user 116, sorting of the identified one or more programs for the user 116, and selection of the one or more programs from the sorted and ranked one or more programs. After selection, the CDS 212 may be configured to obtain or negotiate content rights, permissions, or certificates for the selected one or more programs for play-out to the client device 102, associated with the user 116. The CDS 212 may be communicably coupled with the PPG 216, and further configured to transmit the selection for the one or more programs to the PPG 216.

The CS 214 may comprise suitable circuit, interface, may comprise suitable logic, circuitry and interfaces that may be configured to store and manage an inventory of one or more media assets (programming and/or non-programming) and a curated repository of programs, associated rights, certificates or licenses for the one or more media assets, and the curated repository of programs. The CS 214 may comprise at least the assets and rights database 214A.

The assets and rights database 214A may comprise suitable logic, circuitry and interfaces that may be configured to store the one or more media assets, and associated metadata and rights. Such associated metadata and rights may be invoked or validated at the playback time of the one or more media assets.

The PPG 216 may comprise suitable logic, circuitry and interfaces that may be configured to generate a personalized playlist of the selected one or more programs. The personalized playlist may correspond to a recommended sequence of one or more programs for the corresponding one or more request parameters in the received request, at the PS 208, from the client device 102. Such recommended sequence may be a data structure of one or more recommended sequences associated with metadata for each of the one or more recommended sequences. In accordance with an embodiment, the user 116 may be presented with each of the one or more recommended sequences of the one or more programs at the client device 102. Based on a selection of the recommended sequence from the presented one or more recommended sequences, the PPG 216 may be configured to communicate the personalized playlist of the one or more programs to the dynamic manifest generator 218.

The dynamic manifest generator 218 may comprise suitable logic, circuitry, and interfaces that may be configured to assimilate, prepare, encode, and stream a media stream of the programming media content that comprises the one or more programs of the personalized playlist. The assimilation and preparation of the programming media content is performed in conjunction with retrieval of the programming media content from at least the CS 214 and the CDN 104 associated with the media presentation and distribution system 108. The dynamic manifest generator 218 may comprise the SS 220 and the PLS 222, which may be communicably coupled with each other.

The SS 220 may comprise suitable logic, circuitry, and interfaces that may be configured to assimilate, schedule, encode and package the one or more programs in the personalized playlist for play-out to the client device 102. The SS 220 may be configured to retrieve the one or more programs as per a scheduled play-out of the programming media content. The one or more programs may be retrieved by the SS 220 from at least the CDN 104 or the CS 214 for assimilation of the retrieved one or more programs. As for the uncompressed one or more programs, the SS 220 may be configured to encode each of the one or more uncompressed programs. The SS 220 may be configured to transmit the packaged programming media content to the PLS 222.

The PLS 222 may comprise suitable logic, circuitry, and interfaces that may be configured to encapsulate and stream the programming media content, received from the SS 220, on the media stream (which may be a transport media stream, such as an MPEG-2 TS stream). Additionally, the PLS 222 may be configured to encrypt and stream the media stream to the client device 102, via the network interface 204B. In accordance with an embodiment, the encrypted media stream may be segmented into one or more segments to facilitate adaptive bitrate streaming over to the client device 102 in light of an availability of network bandwidth for the client device 102, associated with the user 116. The PLS 222 may be further configured to transmit a request to the TS 224 for generation and insertion of the one or more tags at determined one or more event opportunity points within the programming media content in the media stream. Such tags may be invoked at the client device 102 to facilitate concurrent playback of the one or more media assets with the programming media content.

The TS 224 may comprise suitable logic, circuitry, and interfaces that may be configured to generate one or more tags, associated metadata, and resources for tagging of the programming media content within the media stream. The generation of each of the one or more tags may be determined for the one or more event opportunity points within the programming media content. Each tag may specify a pointer to a duration of the corresponding event opportunity point within the programming media content, and a descriptor of the corresponding one or more media assets to be loaded at the detection of the corresponding tag at the client device 102. The tagging system may be configured to transmit a request to the MAS 226 to provide the determined one or more event opportunity points within the programming media content and identify information associated with the one or more media assets for playback or overlay at the determined one or more event opportunity points. Such request may be transmitted to the MAS 226 along with the personalized list of the one or more programs. The TS 224 may be configured to insert the generated one or more tags at the determined one or more event opportunity points within the programming media content based on the received request from the client device 102.

The MAS 226 may comprise suitable logic, circuitry, and interfaces that may be configured to determine the one or more event opportunity points within the programming media content and identify information associated with the one or more media assets based on a context, a user-preference, or a defined goal for playback of the one or more media assets within the determined one or more event opportunity points. In accordance with an embodiment, the MAS 226 may determine the one or more event opportunity points based on content recognition of the programming media content. In accordance with an embodiment, the MAS 226 may be configured to determine the one or more event opportunity points based on semantic or context mining of context of the programming media content. Further, the MAS 226 may be configured to identify the information associated with the one or more media assets for playback during the playback time of the determined one or more event opportunity points within the programming media content. The determined one or more event opportunity points, associated metadata, and the identified one or more media assets for presentation may be transmitted to the TS 224.

The EOS 228 may comprise suitable logic, circuitry, and interfaces that may be configured to operate as an event signaling and management (ESAM) server, which may manage execution, performance and personalization of the programming media content, and the one or more media assets for the user 116. In other words, the EOS 228 may be an event decisioning system that may be configured to respond to each request from the client device 102. Example of such request may include, but is not limited to, a selection of the one or more event opportunity points within one or more occurrences of the one or more event opportunity points within the programming media content, a selection of the one or more media assets for playback at the playback time, and the like.

The CU 234 may comprise suitable logic, circuitry, and interfaces that may be configured to monitor execution and performance of the operations performed by each component of the media presentation and distribution system 108.

In operation, in a first scenario, the asset and stream management system 206 may include the CS 214 and the TS 224 but may not include the PS 208, the DMS 210, the CDS 212, the PPG 216, the dynamic manifest generator 218, the SS 220, the PLS 222, the MAS 226, and the EOS 228. In such a scenario, the asset and stream management system 206 may be configured to prepare one or more media assets (programming and/or non-programming) based on retrieval of the one or more media assets from the assets and rights database 214A (or the media assets server 106, i.e., an external server). Examples of a media asset may include, but is not limited to, a bug (i.e., a digital onscreen graphic), a logo, a banner, ⅓rd graphics, and tickers. Each media asset may be either a programming media asset or a non-programming media asset. The TS 224 may be configured to generate and embed one or more tags in prepared one or more media assets (programming and/or non-programming). Alternatively stated, each tag may act as an asset identifier for a media asset and may be generated specifically for such media asset. Additionally, each tag may carry information associated with one or more regions for placement of a specific media asset and behavior and interactivity of the associated media asset at the display view of the client device 102. Each tag may be represented by at least one of a signal, a beacon, a SCTE-35 message, a marker, textual information, binary information, visual information, aural information in the asset stream, and the like. Each tag may include, but is not limited to at least a pointer for a defined playback duration of a corresponding event opportunity point, a modification in a display view the defined playback duration, and a descriptor or pointer to a corresponding media asset to be presented within the playback duration of the corresponding event opportunity point.

In some embodiments, the asset and stream management system 206 may generate a first pair of keys specifically for each media asset that is prepared for delivery to the client device 102. The first pair of keys may include an asset public key and an asset private key, for example, a Rivest-Shamir-Adleman (RSA) public key based on RSA and an RSA private key based on asymmetric encryption techniques. The asset public key may be embedded in the media asset for which the pair of keys were generated and the asset private key may be separately stored in a secure database on the asset and stream management system 206.

The asset and stream management system 206 may be further configured to encapsulate the prepared one or more media assets on an asset stream of the one or more media assets. Alternatively stated, the asset and stream management system 206 may prepare the asset stream that encapsulates the prepared one or more media assets that are embedded with the one or more tags (and/or asset public keys). Along with the asset stream, in some cases, the asset and stream management system 206 may prepare the programming media content as a media stream (e.g., an MPEG-2 TS transport stream).

In some embodiments, the media stream and/or the asset stream may be further segmented (and/or transcoded or trans-rated) by the asset and stream management system 206 into one or more segments, and such media stream and/or the asset stream may be segmented to facilitate an adaptive bitrate streaming (ABS) over to the client device 102, via the communication network 114. The asset and stream management system 206 may transmit the asset stream of the one or more media assets to the client device 102, via the communication network 114. Also, in some cases, the asset and stream management system 206 may transmit the media stream to the client device 102. Such transmission may be executed via one of the HLS technique, the MPEG-DASH technique, or a suitable digital streaming protocol.

In a second scenario that may be different from the first scenario, the asset and stream management system 206 may include the PS 208, the DMS 210, the CDS 212, the CS 214, the PPG 216, the dynamic manifest generator 218, the SS 220, the PLS 222, the TS 224, the MAS 226, and the EOS 228. In such a scenario, the asset and stream management system 206 may be configured to execute a sequence of operations to prepare a media stream of programming media content for a transmission to the client device 102. Different operations of the sequence of operations are hereinafter described.

The network interface 204 of the media presentation and distribution system 108 may be configured to receive a request from the user 116 associated the client device 102, via the communication network 114. The received request may correspond to a request to stream the programming media content at the client device 102. Such programming media content may be personalized for the user 116 based on one of one or more request parameters. The one or more request parameters may include, but are not limited to, a request time, the one or more preferences for the programming media content, device data, network configuration, network IP, device IP and client device type.

The network interface 204 may route the received request to the PS 208. The PS 208 may be configured to extract the one or more request parameters from the received request and parse the one or more request parameters in each received request from the client device 102. The PS 208 may operate as a front-end of the DMS 210 and communicate the parsed one or more request parameters to the DMS 210 and the CDS 212.

The DMS 210 may be configured to store and collate the parsed one or more request parameters with a set of user-preferences of the user 116. The parsed one or more request parameters may define granular interests of the user 116 and therefore, the DMS 210 may generate semantic relationship models (shallow or deep) based on associations built among the granular interests for the corresponding one or more request parameters. Thereafter, the DMS 210 may store and form a data cloud of the one or more preferences, likes, dislikes for the programming media content and the one or more media assets, demography, financial information, location, and the like. Such data cloud for the user 116 may be generated from sources, such as social media footprints, web footprints, searches, past engagements with the programming media content, and specific media assets.

For example, for a user "Alex", the DMS 210 may receive a parsed request parameter that comprises a preference for a "lifestyle" genre, associated with searched keywords "Travel" and "Food". The DMS 210 may retrieve the set of user-preferences associated with the searched keywords or the request parameter. Based on the retrieved set of user preferences, the DMS 210 may infer that "Alex" has a liking for "Paris", "Atlanta", and "Street Food" and a preference for "sea-based locations". The DMS 210 may identify that "Alex" dislikes "Meat Products" and "Cheese Products" from social media footprints. Therefore, the DMS 210 may form a relationship model that may be used to ascertain that "Alex" may be a "Vegan" and may be served with media assets, such as video advertisements or bugs, or the programming media content, which may promote or showcase vegan food around the preferred travel location.

Each preference, like, or dislike may be factored as one or more features for a certain semantic relationship model and each relationship model may be generated based on factoring the one or more features, which may be "1000" or even "10000" for a given scenario. Accordingly, the DMS 210 may further update records for the parsed one or more request parameters, and the generated the relationship models within the user database. Data associated with the user 116 may be shared by the DMS 210 with the PS 208 in response to request received from the PS 208.

The CDS 212 may be configured to identify available one or more programs that may bear correlation with the parsed one or more request parameters or the generated relationship models. For such identification, the CDS 212 may search for available one or more programs within a curated repository of programs in the CS 214. Alternatively, the CDS 212 may search for available one or more programs from media servers of the CDN 104. The CDS 212 may identify the available one or more programs for the user 116, based on the one or more user preferences, one or more targeting parameters, such as location, playback history, demography, age and gender, and applicable content rights. In accordance with an embodiment, the identified one or more programs may be ranked and sorted for the user 116. After identification of the available one or more programs, the CDS 212 may be configured to obtain or negotiate content rights, permissions, or certificates for the identified one or more programs for play-out to the client device 102. The content rights, permissions, or certificates for the identified one or more programs may be obtained from the assets and rights database 214A of the CS 214. In other words, the CDS 212 may identify the preferred programming media content, which may optimally satisfy the requirement of the user 116. The CDS 212 may transmit metadata for the identified one or more programs to the PPG 216.

For example, a user "Smith" may have a preference for "News" from "Georgia", a liking for "Sports News" and a dislike for "Crime News". The CDS 212 may search for available programs within the CS 214 or the CDN 104 that be factored based on preferences, likes or dislikes of "Smith". Accordingly, the CDS 212 identifies "X1_News", "X2_News" and "X3_News" for "Smith". Such programs may be sorted and arranged in an order of relevance for "Smith".

The PPG 216 may be configured to receive the metadata for the identified one or more programs from the CDS 212 and generate a personalized playlist of the identified one or more programs. The personalized playlist may correspond to a recommended sequence of one or more programs for the corresponding one or more request parameters in the received request at the PS 208. Such recommended sequence may be a data structure of one or more recommended sequences associated with metadata for each of the one or more recommended sequences. In an exemplary scenario, one or more recommended sequences of programs of different lengths may be sorted and generated by the CDS 212. The user 116 may be presented with each of the one or more recommended sequences of the one or more programs at the client device 102. Based on a selection of a recommended sequence from the presented one or more recommended sequences, the PPG 216 may communicate the personalized playlist of the one or more programs to the dynamic manifest generator 218. The SS 220 of the dynamic manifest generator 218 may encode the uncompressed one or more programs in the personalized playlist. The SS 220 in the dynamic manifest generator 218 may be further configured to assimilate, schedule, and package the encoded one or more programs in the personalized list, in conjunction with the CS 214 or the CDN 104. The encoding, assimilation, scheduling, and packaging of the one or more programs as the programming media content may be performed for the retrieved programming media content from at least the CS 214 and the CDN 104. For assimilation and scheduling, the SS 220 may retrieve the one or more programs as per the personalized playlist, as scheduled for play-out at the client device 102. The packaged programming media content of the one or more programs may be transmitted to the PLS 222.

In some embodiments, a request may be transmitted, from the PLS 222, for generation and insertion of one or more tags at one or more event opportunity points within the programming media content to the TS 224. Such one or more tags may be invoked at the client device 102 during play-out of the programming media content and therefore, may facilitate presentation of one or more media assets (e.g., overlay graphics, such as banners, ⅓rd graphics, bugs, logos, and tickers, promotional videos, etc.) over (or between different segments of) the programming media content. Based on the received request, the TS 224 may transmit a request to the MAS 226 to provide one or more event opportunity points within the programming media content and identify information associated with the one or more media assets (programming and/or non-programming) for presentation at the determined one or more event opportunity points. In response to the received request from the TS 224, the MAS 226 may determine the one or more event opportunity points within the programming media content and identify the information associated with the one or more media assets. Example of the information associated with the one or more media assets may include, but are not limited to, contexts, durations, asset type, and goal definitions. The information may be used to derive context tags, preference tags associated the one or more preferences of the user 116 or goals tags for the one or more media assets. Each event opportunity point may correspond to a specified event within the programming media content and such specified event may correspond to, but is not limited to, at least start credits, end credits, lull points, time-based marked regions, location-based marked regions, context-based marked regions within the programming media content, product placement opportunities, and a combination thereof.

The MAS 226 may transmit the determined one or more event opportunity points, associated metadata, and the identified information associated with the one or more media assets to the TS 224. The TS 224 may be configured to generate the one or more tags, associated metadata, and resources for the programming media content. The generation of each of the one or more tags may be done for the determined one or more event opportunity points within the programming media content. The generated one or more tags may be inserted by the TS 224 at the determined one or more event opportunity points within the programming media content. Each tag may specify at least a pointer to duration of the corresponding event opportunity point within the programming media content and a descriptor of the corresponding identified one or more media assets to be presented with the programming media content at the client device 102.

The PLS 222 may encapsulate the programming media content as well as the prepared one or more media assets on a media stream of the programming media content and the one or more media assets. Alternatively stated, the PLS 222 may prepare a media stream (e.g., a transport media stream, such as an MPEG-2 TS) that encapsulates the programming media content and the one or more media assets. In some embodiments, the media stream and/or the asset stream may be further segmented (and/or transcoder or trans-rated) by the PLS 222 into one or more segments, and such media stream and/or the asset stream may be segmented to facilitate an adaptive bitrate streaming (ABS) over to the client device 102, via the communication network 114. The PLS 222 may transmit the media stream of the programming media content, inserted with the one or more tags and packaged with the one or more media assets, to the client device 102, via the communication network 114. Such transmission of the media stream to the client device 102 may be executed via one of the HLS technique, the MPEG-DASH technique, or a suitable digital streaming protocol.

In both of the first scenario or the second scenario, the client device 102 may be configured to receive at least one of the asset stream of the one or more media assets (programming or non-programming) and/or the media stream that includes programming media content packaged with the one or more media assets.

At the client-end, the first circuitry 202 of the client device 102 may be configured to receive an asset stream of the one or more media assets that includes one or more tags embedded in the one or more media assets. The client device 102 may be further configured to decode and execute the playback (i.e., display or presentation) of the one or more media assets (programming and/or non-programming). The playback of the one or more media assets may be executed in a sequence (as specified in a manifest, e.g., a client manifest or a schedule prepared at the media presentation and distribution system 108). In some embodiments, the client device 102 may be configured to execute the playback (i.e., display or presentation) of the one or more media assets over (or between different segments) of the programming media content as part of the received media stream. The playback of the one or more media assets at the client device 102 may require a concrete verification at the server-side (i.e. at the media presentation and distribution system 108). In certain embodiments, therefore, the client device 102 may be configured to transmit a request, for verification of the playback of the one or more media assets, to the verification server 110. In other embodiments, the verification server 110 may self-initiate the verification of the playback of the one or more media assets onto a display view associated with the client device 102.

The server-side verification may be done based on one or more techniques, which may be used to identify one or more deviations with the playback of the one or more media assets onto the display view associated with the client device 102. Example of the one or more deviations may include, but are not limited to, a partial overlay, a color imbalance, an error with transition or overlay, an abrupt disappearance of the one or more media assets or the programming media content from the display view, a non-responsive playback of the one or more media assets, and a misplacement of a media asset on the display view in event of a modification (e.g., squeeze back, hot start, etc.) of the display view. The one or more deviations may be identified by the verification server 110 with respect to defined asset delivery criteria. The defined asset delivery criteria may include a verification of at least a display time, a display duration, a display frequency, a specified slot within a specified program of the programming media content, a number of interactions with the verified media asset, an enablement of one or more features at the playback time of the associated media asset, a responsive display of a media asset for one or more user-interactions, and a specified modification (e.g., squeeze back, hot start, etc.) in the display view for a media asset. There may be different verification techniques that may be implemented by the verification server 110 and may further require operational support (i.e. offloading some key operations in the verification) from the client device 102.

In accordance with an embodiment, for one such verification technique, the client device 102 may be configured to extract the asset public key from each media asset of the one or more media assets. In some cases, the playback (or presentation) of a media asset may require an access to the asset public key inserted in the media asset. The client device 102 may be configured to determine whether a second pair of keys of the client device 102 (or a media application that executes playback) are already stored on the client device 102. The second pair of keys may include the client public key and the client private key. More specifically, the client device 102 may be configured to determine whether the client public key and the client private key are already stored on the client device 102. In a case where the second pair of keys are not stored on the client device 102, the client device 102 may be configured to generate a client private key and store the generated client private key on the client device 102. Otherwise, the client device 102 may be configured to reuse the already stored client private key in the verification process for the playback of the one or more media assets.

The client device 102 may be further configured to detect an asset identifier associated with each media asset of the one or more media assets during playback of each media asset on the client device 102. The asset identifier may be detected based on identification of a tag of the one or more tags inserted with the one or more media assets. The client device 102 may be further configured to generate support information for each media asset, in response to the detection of the asset identifier. The support information is generated for verification of the playback of each media asset at the client device 102. The support information may include a verification message that may be prepared for each media asset of the one or more media assets. The verification message may indicate that a media asset has been viewed (or played/presented) onto a display view of the client device 102. The verification message may include the asset identifier associated with each media asset (detected previously by the client device 102) and the client public key (stored or generated on the client device 102). The client device 102 may be further configured to encrypt the generated verification message by using the client private key (generated or already stored on the client device 102) and the asset public key for the media asset (extracted the media asset). Thereafter, the support information that may include the encrypted verification message, the client public key, and the asset identifier for the media asset may be transmitted, by the client device 102, to the verification server 110 of the media presentation and distribution system 108, via the communication network 114.

At the media presentation and distribution system 108, the verification server 110 may be configured to receive the support information in response to the detection of the asset identifier at the client device 102. Specifically, the verification server 110 may be configured to receive the encrypted verification message, the client public key, and the detected asset identifier for a media asset, from the client device 102, via the communication network 114. The verification server 110 may be configured to search for the asset private key of a media asset for which the asset identifier is received by the verification server 110. As a result, based on the search, the asset private key may be identified by the verification server 110. An attempt to decrypt the encrypted verification message may be done by the verification server 110 based on the identified asset private key. In an event where the encrypted verification message is successfully decrypted on the verification server 110, confirmation information may be generated by the verification server 110. The decryption may correspond to the verification of the playback of each media asset at the client device 102. The confirmation information may indicate the event of successful decryption of verification message and a verification of the playback (or presentation) of the media asset at the client device 102. In an event where the decryption of the encrypted verification message fails by using the identified asset private key, information that invalidates the encrypted verification message may be generated based on unsuccessful decryption of the encrypted verification message. An unsuccessful decryption results in a lack of verification of asset presentation, and thus no record of verification.

The verification server 110 may be therefore configured to verify the playback of the one or more media assets on the client device 102 based on the received support information (encrypted verification message, the asset identifier, or the client public key) from the client device 102. The playback of the one or more media assets are verified to satisfy the defined asset delivery criteria and to identify and debug at least one deviation or at least one error with the playback of the one or more media assets.

The verification server 110 may be further configured to generate a record that may indicate that the media asset (for which asset identifier is received from the client device 102) has been viewed (or played/presented) at the client device 102. In some cases, the verification server 110 may be configured to encrypt the generated record using the asset private key (identified based on the search) and the client public key (received with the encrypted verification message). Also, the verification server 110 may be further configured to digitally sign the encrypted record using a server private key (i.e. the private key of the verification server 110) to further verify (and/or validate) an authenticity of the generated record with other verification servers (managed by the verification server 110 or other third party verification systems).

The verification server 110 may be further configured to transfer the encrypted and signed (or unencrypted and unsigned) record to the record storage system 232. Thereafter, the record storage system 232 may be configured to store the encrypted and signed (or unencrypted and unsigned) record in a database maintained at the record storage system 232. Alternatively stated, the digitally signed record for each media asset may be stored in a database of records arranged in a sequence of verification units. The sequence of verification units may correspond to at least one of a blockchain of a plurality of blocks or a distributed data store, and each block may include a cryptographic hash of a previous block of signed records. Alternatively, the database may be implemented based on other suitable storage techniques.

In accordance with another embodiment, for another verification technique, the client device 102 may be configured to detect the asset identifier for each media asset that is prepared for the playback on the client device 102. Alternatively stated, the client device 102 may detect a tag (of the one or more tags inserted in the one or more media assets), which may represent an identifier of the media asset (i.e. the asset identifier) for the verification server 110. The client device 102 may be further configured to generate support information for each media asset, in response to the detection of the asset identifier. The support information may be generated for verification of the playback of each media asset at the client device 102. More specifically, the client device 102 may be configured to construct a representation information of the display view (onto which the media assets are presented at the client device 102. The constructed representation information may be at least one of, but is not limited to an image (e.g., a screenshot of the display view at the client-side), data, such as, a log of binary data in a display rasterization buffer (present on a display panel) or on the client device 102, and a video clip or an audio clip that corresponds to a portion of each media asset, or a combination thereof.

The client device 102 may be further configured to generate a message that may include the support information (i.e., the constructed representation information, the detected asset identifier, and/or the client public key). The support information (i.e., the constructed representation information, the detected asset identifier, and/or the client public key) may be transmitted, by the client device 102, to the verification server 110, via the communication network 114.

At the media presentation and distribution system 108, the verification server 110 may be configured to receive the support information in response to the detection of the asset identifier at the client device 102. Specifically, the verification server 110 may be configured to receive the message that includes the constructed representation information, the client public key, and the detected asset identifier for a media asset, from the client device 102, via the communication network 114. The verification server 110 may be further configured to analyze the constructed representation information, based on at least one of content recognition, data analysis, image reconstruction, or other techniques that may be known to one skilled in the art. Therefore, the description of such techniques have been omitted from the disclosure for the sake of brevity.

The analysis of the constructed representation information on the basis of content recognition may be executed to further identify whether the one or more media assets (programming and/or non-programming) have been loaded and adaptively displayed within the display view (i.e., a dedicated user interface (UI)) on the client device 102. The identification may be done in accordance with specifications (i.e. display attributes and preferences) for the media assets that are defined by the media presentation and distribution system 108. The application of content recognition on received representation information may be a statistical signal processing technique that may process an audio stream, video stream, or an image of the display view at the client device 102. Based on the content recognition, the verification server 110 may also identify one or more regions-of-interest in the received representation information where a possibility of verifying the identity of a media asset is maximum.

The content recognition may include different techniques to identify the different attributes from the received representation information and such attributes may be used to verify the playback of the media asset from the received representation information. Examples of different techniques may include, but are not limited to acoustic fingerprinting, digital watermarking, and digital video fingerprinting. Additionally, supervised or unsupervised machine learning, deep learning, neural network, artificially intelligence (AI) associated techniques, or other techniques may be implemented to precisely verify the playback of the media asset based on content recognition of the received representation information.

After the analysis, the verification server 110 may be further configured to determine whether the display and placement (i.e., position and arrangement) of the media asset in the received representation information matches a defined asset delivery criteria. The defined asset delivery criteria may be requirements specified for the media asset at the preparation stage of the media asset by the asset and stream management system 206. The defined asset delivery criteria may include a set of presentation attributes based on which each media asset is configured for presentation onto the display view of the client device 102. The set of presentation attributes may include, but are not limited to a display time, a display duration, a display frequency, a specified slot within a specified program of programming media content, a number of user interactions with a media asset, an enablement of a specific feature at a playback time of a media asset, a responsive display of a media asset for a user interaction, and a specified modification in the display view for a media asset.

In a case where the display and placement of the media asset in the received representation information matches to that of the requirements, the verification server 110 may be configured to validate the received representation information that was constructed at the client device 102 during the playback (or presentation) of the media asset. The validation of the constructed representation information for each media asset may correspond to the verification of the playback of each media asset at the client device 102. Otherwise, the verification server 110 may be configured to invalidate the received representation information constructed at the client device 102. In such case, the verification server 110 may update a verification log (maintained on the verification server 110 and/or at the client device 102) and may continue to receive support information for other media assets.

In event of a validation, the verification server 110 may be further configured to generate a record that may indicate that the media asset (for which asset identifier is received from the client device 102) has been viewed (or played/presented) at the client device 102. In some cases, the verification server 110 may be configured to encrypt the generated record using the asset private key and the client public key (received with the constructed representation). Also, the verification server 110 may be further configured to digitally sign the encrypted record using a server private key (i.e. the private key of the verification server 110) to further verify (and/or validate) an authenticity of the generated record with other verification servers (managed by the verification server 110 or other third party verification systems).

The verification server 110 may be further configured to transfer the encrypted and signed (or unencrypted and unsigned) record to the record storage system 232. Thereafter, the record storage system 232 may be configured to store the encrypted and signed (or unencrypted and unsigned) record in a database maintained at the record storage system 232. The database may include a blockchain with a plurality of blocks where a record is stored after every verification. Each block may include a cryptographic hash of a previous block of records. Alternatively, the database may be implemented based on other suitable storage techniques.

In some embodiments, the verification server 110 may be configured to create a virtual instance of the display view of the client device 102 that mimics (or simulates) the playback of the one or more media assets at the client device 102. In such scenario, the verification server 110 may receive the support information that may include an activity (or playback) log of the client device 102 in real time. The activity (or playback) log may include granular details of different playback operations (e.g., decoding media assets, detecting tags, overlaying media asset, etc.) executed at the client device 102 throughout a playback cycle. Based on the received support information, the verification server 110 may be configured to simulate the playback of each media asset at the virtual instance of the display view of the client device 102.

The delegation of verification at the verification server 110 may be executed to prevent intensive usage of processing circuitry or memory of the client device 102 and to facilitate seamless operation of other applications on the client device 102. Such server-side verification may be based on one or more techniques, which may identify one or more deviations with the playback of the one or more media assets at the display view of the client device 102. Example of the one or more deviations may include, but are not limited to, a partial overlay, a color imbalance, an error with transition or overlay, an abrupt disappearance of the one or more media assets or the programming media content from the modified display view, and a non-responsive playback of the one or more media assets. In response to the detection of the one or more deviations, the verification server 110 may be configured to trigger, in conjunction with the media presentation and distribution system 108, one or more circuitries or programmable routines to adjust or correct the detected one or more deviations with the playback of the one or more media assets onto the display view of the client device 102.

For example, a user (P) may be engaged with an NBA match, played on-demand at the display view of the client device 102. A time-out or foul happens during the NBA match and based on a tag at the foul time or the time-out, the client device 102 may play an overlaid "beverage brand X" bug at the rightmost corner of the display view of the client device 102. The verification server 110 may receive the log data for detection of the asset identifier associated with a tag embedded with the "beverage brand X" bug. Based on the log, the verification server 110 may be further configured to simulate the placement or overlaying of the "beverage brand X" bug at the virtual client of the client device 102 and identify deviations with overlay of the "beverage brand X" bug within the simulation of the virtual client. For deviations, such as, delay of 10 seconds for appearance of the "beverage brand X" bug, the verification server 110 may send control signals having debugging routines to the client device 102 for near real time adjustment or correction of the recorded deviation.

The operations of each component of the media presentation and distribution system 108 may be monitored, controlled, and calibrated, via one or more control signals of the control unit 234 along with the second circuitry 230 of the verification server 110. Each component may be monitored, controlled, and calibrated for synchronized and lag-free operations for the requests received from the client device 102.

Figure 3A:
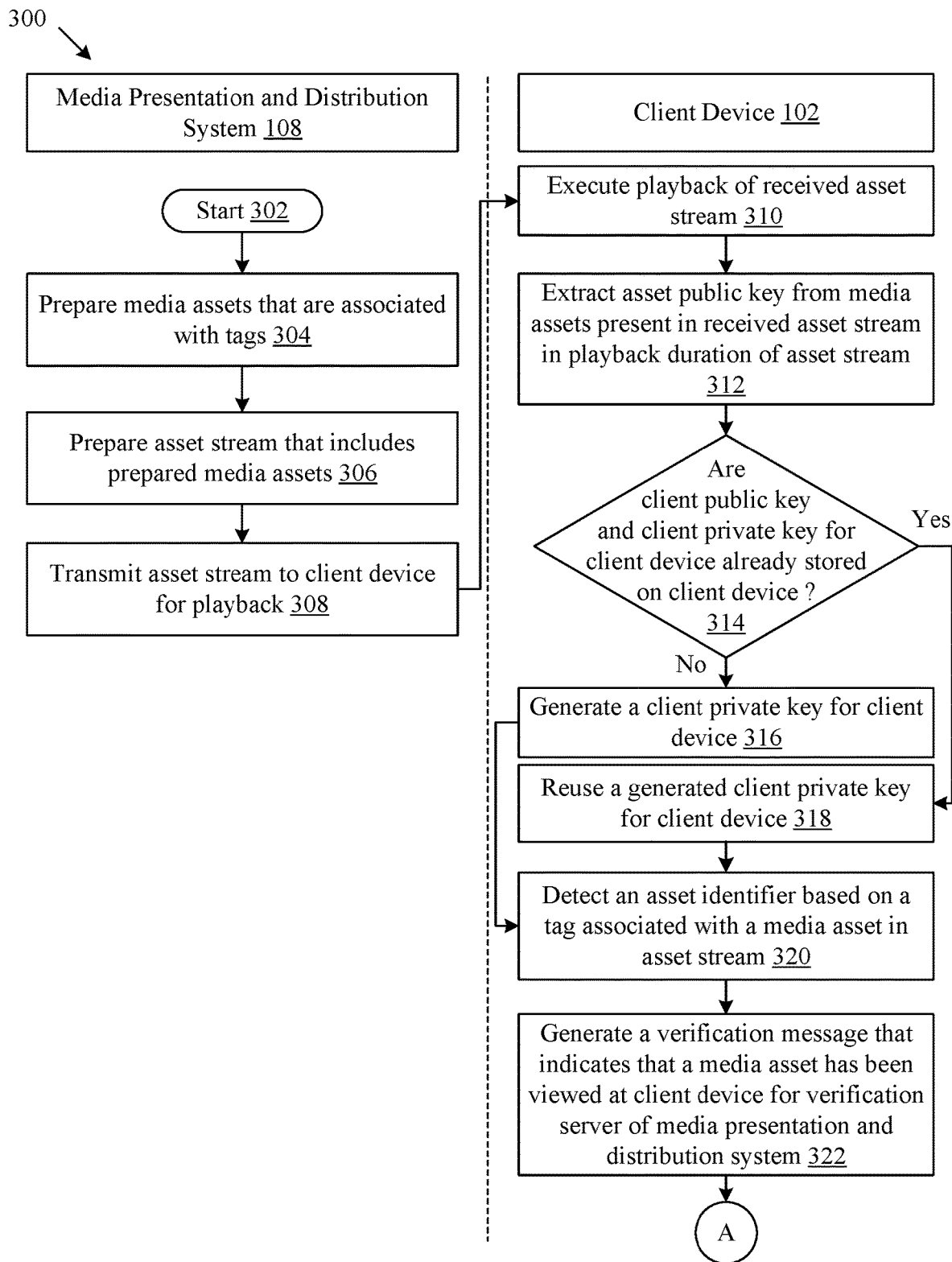
FIGS. 3A, 3B, and 3C depict a flowchart that collectively illustrates exemplary operations for verification of playback of media assets, based on public/private key-based verification, in accordance with an exemplary embodiment of the present disclosure.
Figure 3B:
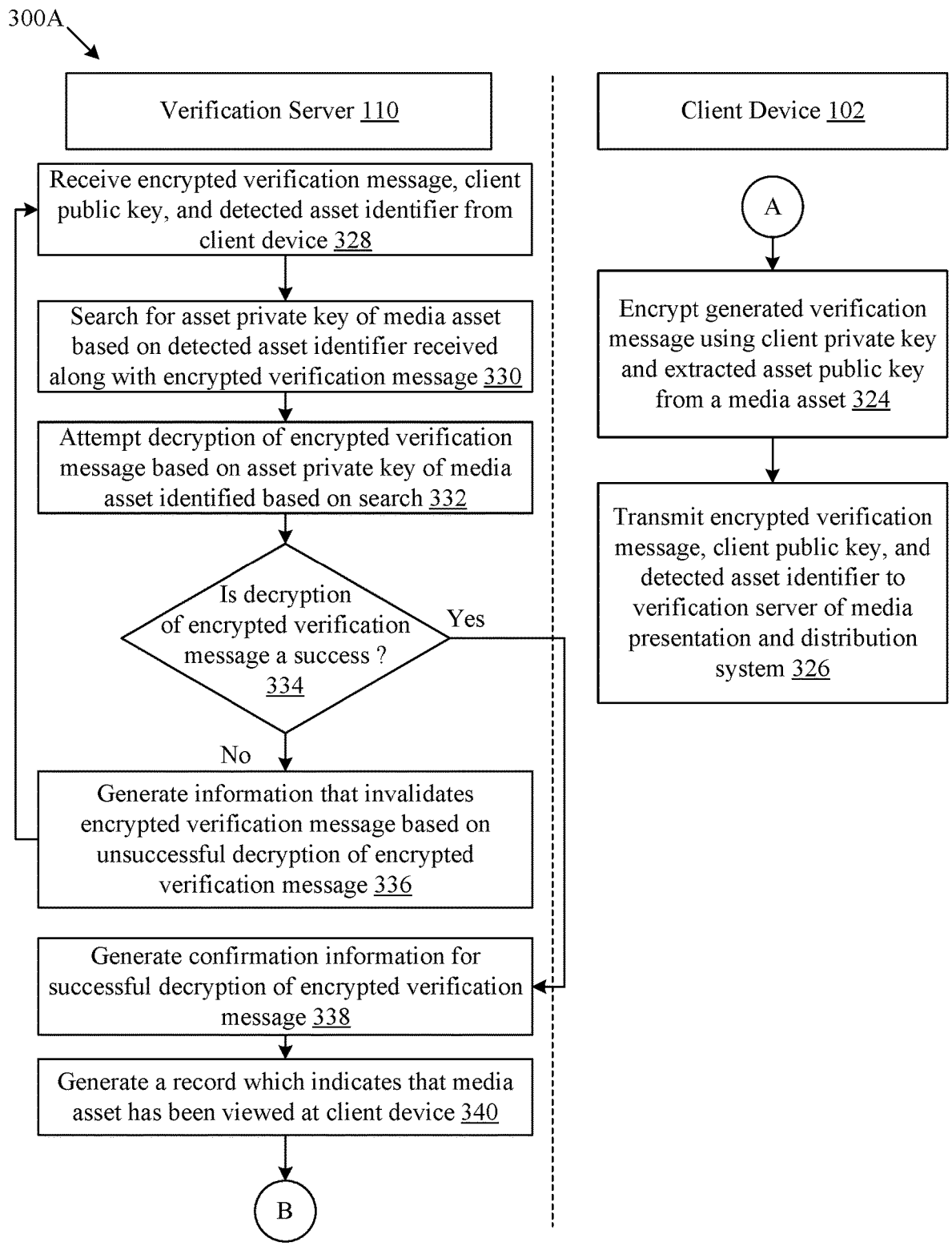
Figure 3C:
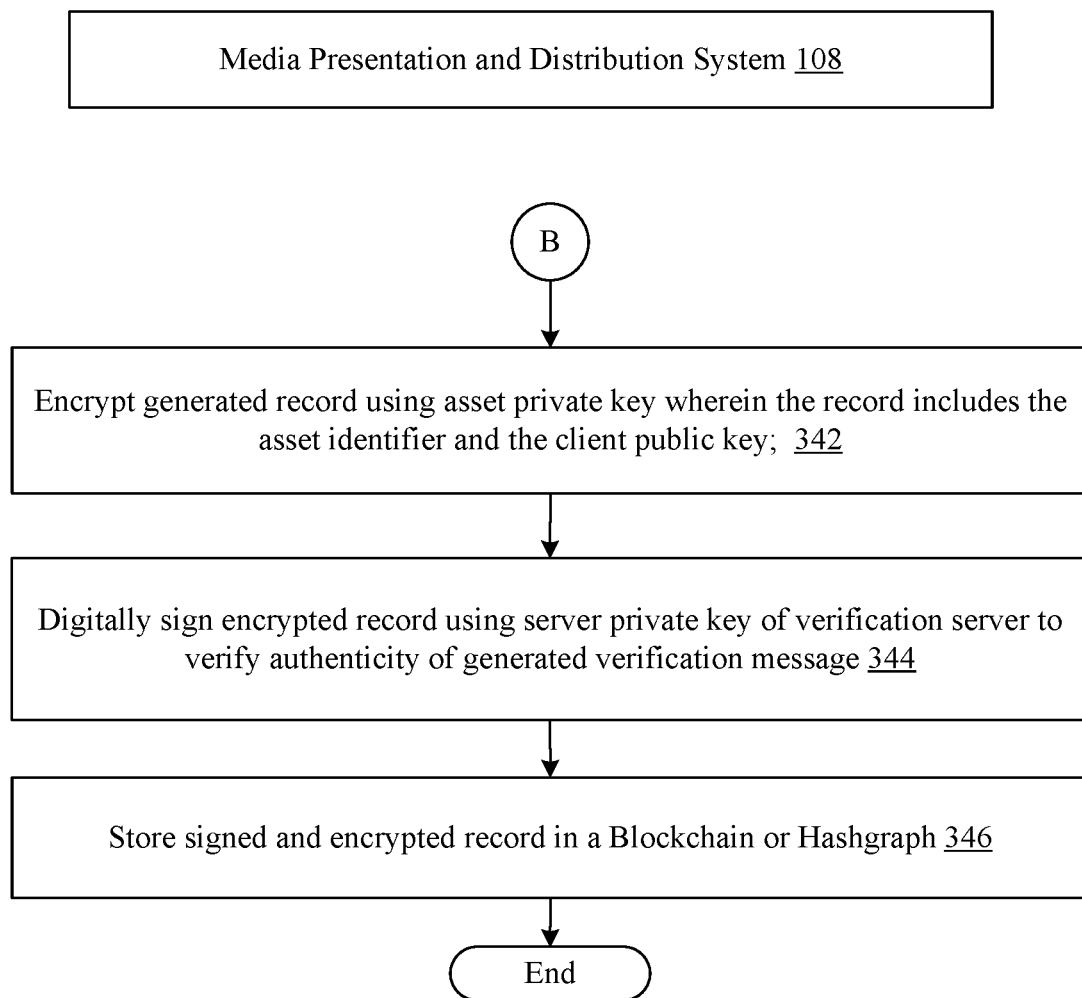

FIGS. 3A, 3B and 3C depict a flowchart that collectively illustrates exemplary operations for verification of playback of media assets, based on public/private key-based verification, in accordance with an exemplary embodiment of the present disclosure. FIGS. 3A, 3B, and 3C are explained in conjunction with elements from FIGS. 1 and 2. With reference to FIGS. 3A, 3B, and 3C, there is shown a flowchart 300. The method described in the flowchart 300 may start at 302 and proceed to 304.

At 304, media assets that may be associated with one or more tags may be prepared. The asset and stream management system 206 may be configured to prepare the media assets that may be associated with one or more tags.

At 306, an asset stream that includes the prepared media assets may be prepared. The asset and stream management system 206 may be configured to prepare the asset stream that includes the prepared media assets.

At 308, the media stream may be transmitted to the client device 102 for a playback. The asset and stream management system 206 may be configured to transmit the asset stream to the client device 102 for a playback at the client device 102.

At 310, playback of the received asset stream may be executed. The client device 102 may be configured to execute the playback of the received asset stream onto a display view associated with client device 102.

At 312, an asset public key may be extracted from a media asset present in the received asset stream in a playback duration of the asset stream. The client device 102 may be configured to extract an asset public key from a media asset present in the received asset stream in a playback duration of the asset stream on the client device 102.

At 314, it may be determined whether the client public key and the client private key are already stored on the client device 102. The client device 102 may be configured to determine whether the client public key and the client private key are already stored on the client device 102. In a case where the client the client public key and the client private key are already stored on the client device 102, control passes to 318. Otherwise control passes to 316.

At 316, a client private key for the client device 102 may be generated. The client device 102 may be configured to generate a client private key for the client device 102.

At 318, the client private key for the client device 102 may be reused. The client device 102 may be configured to reuse the already stored client private key for the client device 102.

At 320, an asset identifier may be detected based on a tag associated with a media asset in the media stream. The client device 102 may be configured to detect an asset identifier based on a tag associated with a media asset in the media stream.

At 322, a verification message that indicates that a media asset has been viewed at the client device 102, may be generated for the verification server 110 of the media presentation and distribution system 108. The client device 102 may be configured to generate a verification message that indicates that a media asset has been viewed at the client device 102, for the verification server 110 of the media presentation and distribution system 108.

At 324, the generated verification message may be encrypted using the generated client private key and the extracted asset public key from a media asset. The client device 102 may be configured to encrypt the generated verification message using the generated client private key and the extracted asset public key from a media asset.

At 326, the encrypted verification message, the extracted client public key, and the detected asset identified may be transmitted to the verification server 110 of the media presentation and distribution system 108. The client device 102 may be configured to transmit the encrypted verification message, the extracted client public key, and the detected asset identified to the verification server 110 of the media presentation and distribution system 108.

At 328, the encrypted verification message, the extracted client public key, and the detected asset identified may be received from the client device 102. The verification server 110 may be configured to receive the encrypted verification message, the extracted client public key, and the detected asset identified from the client device 102.

At 330, a search for an asset private key of the media asset may be done based on the asset identifier received along with the encrypted verification message. The verification server 110 may be configured to search for an asset private key of the media asset based on the asset identifier received along with the encrypted verification message.

At 332, the decryption of the received encrypted verification message may be attempted based on the asset private key identified based on the search. The verification server 110 may be configured to attempt the decryption of the received encrypted verification message based on the asset private key identified based on the search.

At 334, it may be determined whether the decryption of the encrypted verification message was a success. The verification server 110 may be configured to determine whether the decryption of the encrypted verification message was a success. In an event where the decryption of the encrypted verification message was a success, control passed to 338. Otherwise, control passes to 336.

At 336, information may be generated that may invalidate the encrypted verification message based on an unsuccessful decryption of the encrypted verification message. The verification server 110 may be configured to generate the information that may invalidate the encrypted verification message based on an unsuccessful decryption of the encrypted verification message.

At 338, confirmation information may be generated for a successful decryption of the encrypted verification message. The verification server 110 may be configured to generate the confirmation information for a successful decryption of the encrypted verification message.

At 340, a record may be generated that may indicate that the media asset has been viewed at the client device 102. The verification server 110 may be configured to generate a record that may indicate that the media asset has been viewed at the client device 102.

At 342, the generated record may be encrypted using asset private key and the client public key as received with the encrypted verification message. The verification server 110 may be configured to encrypt the generated record using asset private key and the client public key as received with the encrypted verification message.

At 344, the encrypted record may be digitally signed, using a server private key of the verification server 110, to verify authenticity of the encrypted verification message. The verification server 110 may be configured to digitally sign the encrypted record, using a server private key of the verification server 110, to verify authenticity of the encrypted verification message.

At 346, the signed and encrypted record may be stored in a blockchain or other distributed storage. The record storage system 232 may be configured to store the signal and encrypted record in a blockchain or other distributed storage. Control passes to end.

Figure 4A:
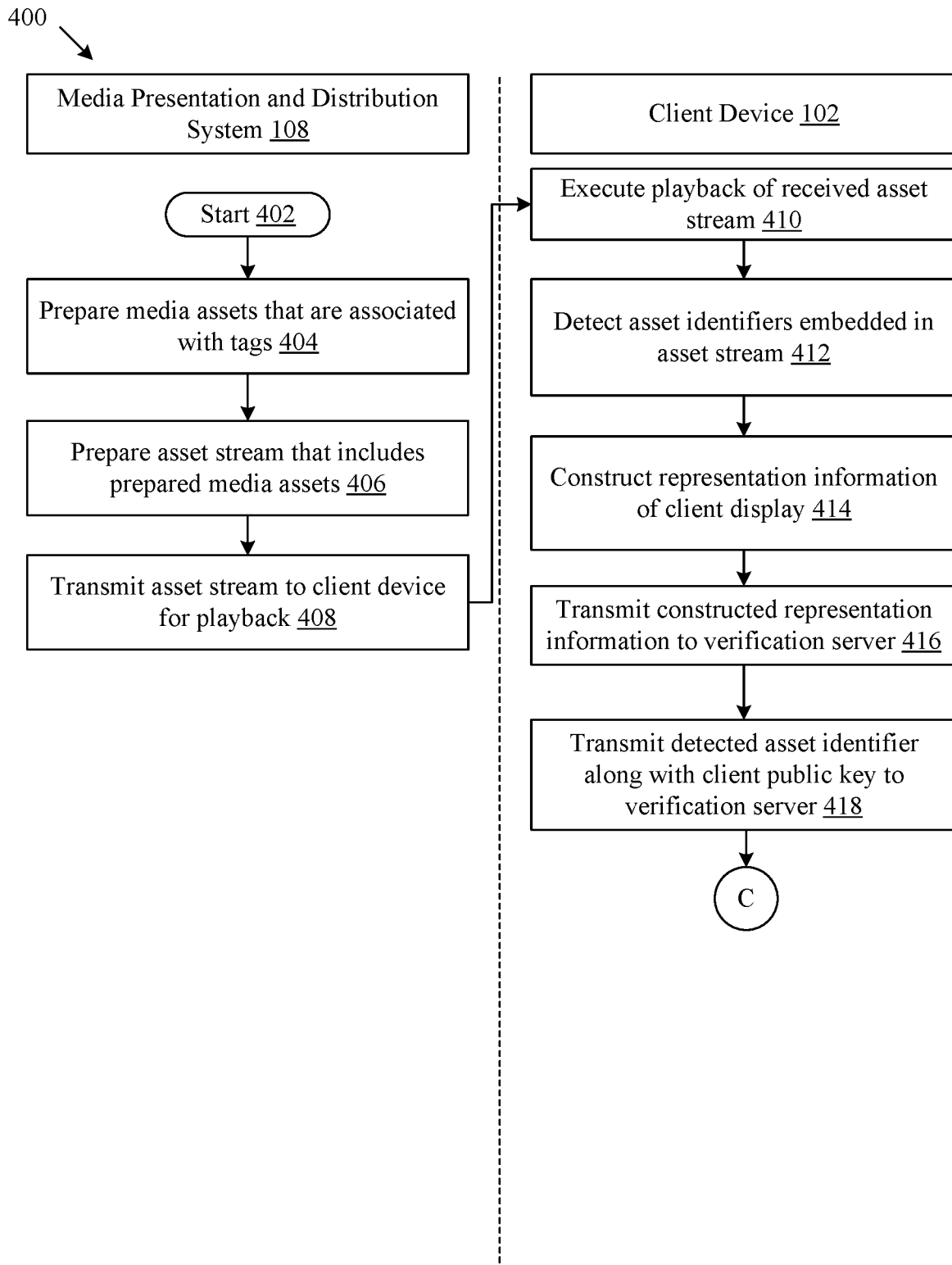
FIGS. 4A and 4B depict a flowchart that collectively illustrates exemplary operations for verification of playback of media assets, based on analysis of a constructed representation of display view of the client device, in accordance with an exemplary embodiment of the present disclosure.
Figure 4B:
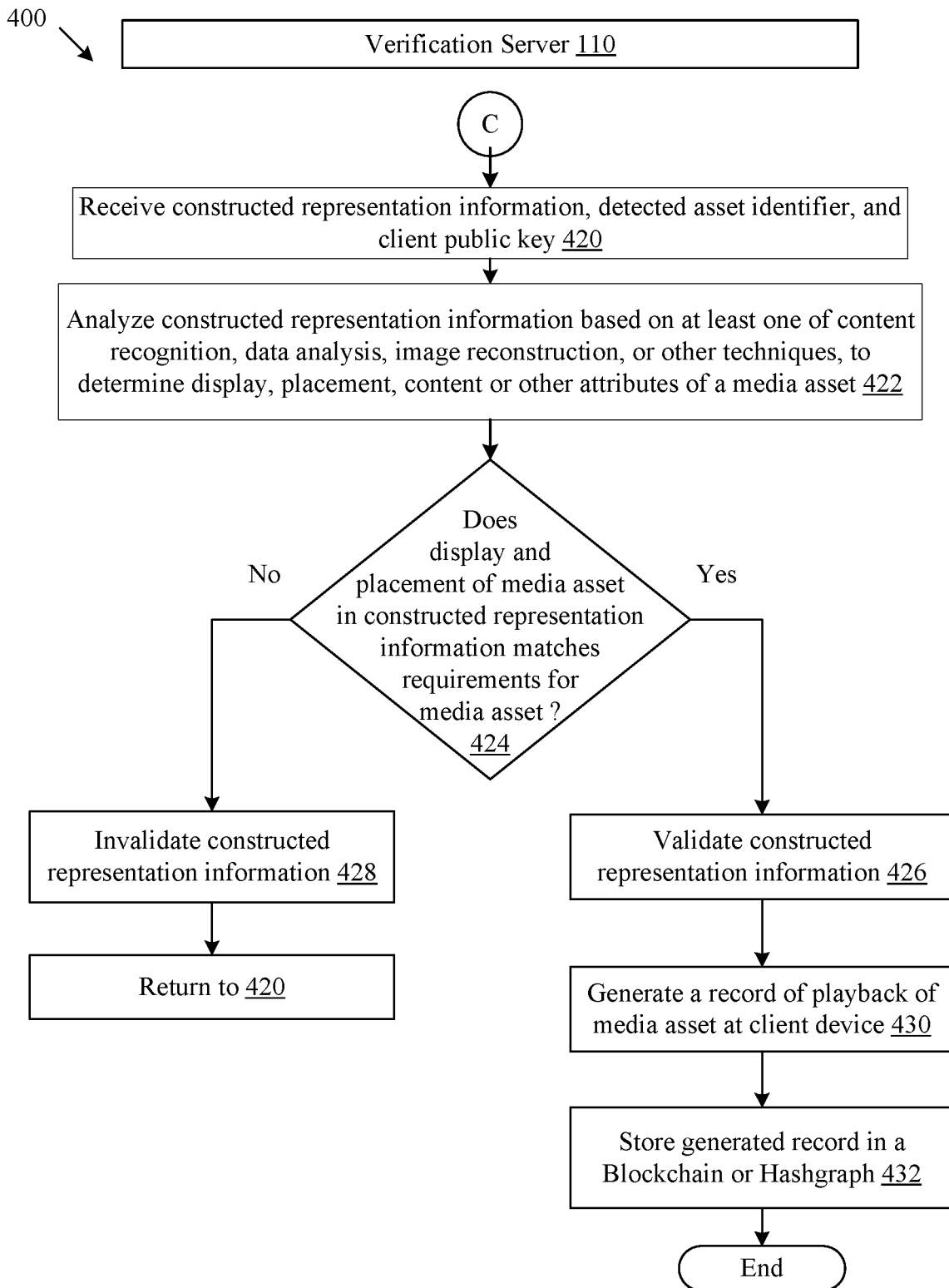

FIGS. 4A and 4B depict a flowchart that collectively illustrates exemplary operations for verification of playback of media assets, based on analysis of a constructed representation information of a display view of a client device, in accordance with an exemplary embodiment of the present disclosure. FIGS. 4A and 4B are explained in conjunction with elements from FIGS. 1 and 2. With reference to FIGS.

4A and 4B, there is shown a flowchart 400. The method described in the flowchart 400 may start at 402 and proceed to 404.

At 404, media assets that may be associated with one or more tags may be prepared. The asset and stream management system 206 may be configured to prepare the media assets that may be associated with one or more tags.

At 406, an asset stream that includes the prepared media assets may be prepared. The asset and stream management system 206 may be configured to prepare the asset stream that includes the prepared media assets.

At 408, the media stream may be transmitted to the client device 102 for a playback. The asset and stream management system 206 may be configured to transmit the asset stream to the client device 102 for a playback at the client device 102.

At 410, playback of the received asset stream may be executed. The client device 102 may be configured to execute the playback of the received asset stream onto a display view associated with client device 102.

At 412, an asset identifier embedded in the asset stream may be detected. The client device 102 may be configured to detect the asset identifier embedded in the asset stream. The asset identifier may be used to uniquely identify a media asset.

At 414, representation information of a display view of the client device 102 may be constructed. The client device 102 may be configured to construct the representation information of a display view of the client device 102.

At 416, the constructed representation information may be transmitted to the verification server 110. The client device 102 may be configured to transmit the constructed representation information to the verification server 110.

At 418, the detected asset identifier may be transmitted along with the client public key to the verification server 110. The client device 102 may be configured to transmit the detected asset identifier along with the client public key to the verification server 110.

At 420, the constructed representation information, the detected asset identifier, and client public key may be received. The verification server 110 may be configured to receive the constructed representation information, the detected asset identifier, and client public key from the client device 102.

At 422, the constructed representation information may be analyzed based on at least one of content recognition, data analysis, image reconstruction, or other techniques, to determine display, placement, content, or other attributes of the media asset. The verification server 110 may be configured to analyze the constructed representation information, based on at least one of content recognition, data analysis, image reconstruction, or other techniques, to determine display, placement, content, or other attributes of the media asset.

At 424, it may be determined whether the display and the placement of the media asset in the constructed representation information matches requirements for the media asset. The verification server 110 may be configured to determine whether the display and the placement of the media asset in the constructed representation information matches requirements for the media asset. In a case where there is a match, control passes to 426. Otherwise, control passes to 428.

At 426, the constructed representation information may be validated. The verification server 110 may be configured to validate the constructed representation information in an event when the display and the placement of the media asset in the constructed representation information matches requirements for the media asset.

At 428, the constructed representation information may be invalidated. The verification server 110 may be configured to invalidate the constructed representation information in an event when the display and the placement of the media asset in the constructed representation information mismatches requirements for the media asset.

At 430, a record that indicates verification of the playback of the media asset may be generated. The verification server 110 may be configured to generate the record that indicates verification of the playback of the media asset.

At 432, the generated record may be stored in a blockchain or other distributed storage. The record storage system 232 may be configured to store the generated record in a blockchain or other distributed storage. Control passes to end.

Figure 5:
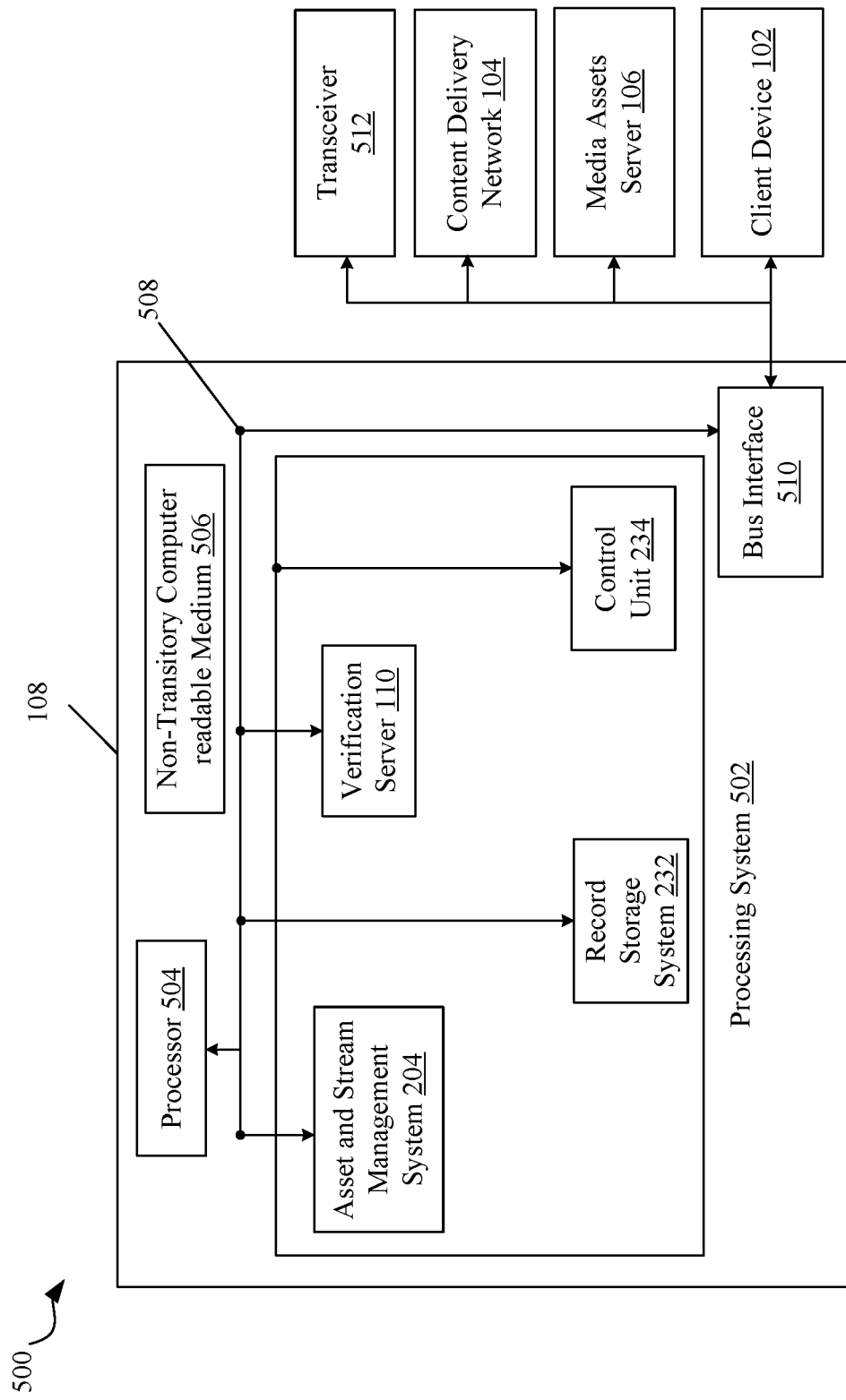
FIG. 5 is a diagram that illustrates an example of a hardware implementation for a media presentation and distribution system that employs a processing system for server-side verification of playback of media assets at a client device, in accordance with an exemplary embodiment of the disclosure.

FIG. 5 is a diagram that illustrates an example of a hardware implementation for a media presentation and distribution system that employs a processing system for server-side verification of playback of media assets presented with programming media content at a client device, in accordance with an exemplary embodiment of the disclosure. With reference to FIG. 5, the hardware implementation is shown by a representation 500 for the media presentation and distribution system 108 for server-side verification of playback of media assets, in accordance with an exemplary embodiment of the disclosure, as described herein. In some examples, the processing system 502 may include one or more hardware processors 504, non-transitory computer readable medium 506, the asset and stream management system 206, the verification server 110, the record storage system 232, and the control unit 234.

In this example, the media presentation and distribution system 108 that employs the processing system 502 may be implemented with bus architecture, represented generally by the bus 508. The bus 508 may include any number of interconnecting buses and bridges depending on the specific implementation of the media presentation and distribution system 108 and the overall design constraints. The bus 508 links together various circuits including the one or more processors, represented generally by the hardware processor 504, the non-transitory computer-readable media, represented generally by the non-transitory computer readable medium 506, the asset and stream management system 206, the verification server 110, the record storage system 232, and the control unit 234, which may be configured to carry out one or more operations or methods described herein. A bus interface 510 provides an interface between the bus 508 and a transceiver 512. The transceiver 512 facilitates communication via the communication network 114 (FIG. 1) with various other apparatus, such as the CDN 104, the client device 102, and the media assets server 106.

The hardware processor 504 may be configured to manage the bus 508 and general processing, including the execution of a set of instructions stored on the non-transitory computer readable medium 506. The set of instructions, when executed by the hardware processor 504, causes the media presentation and distribution system 108 to execute the various functions described herein for any particular apparatus. The non-transitory computer readable medium 506 may also be used for storing data that is manipulated by the hardware processor 504 when executing the set of instructions. The non-transitory computer readable medium 506 may also be configured to store data for one or more of the asset and stream management system 206, the verification server 110, the record storage system 232, and the control unit 234.

In accordance with an aspect of the disclosure, the hardware processor 504, the non-transitory computer readable medium 506, or a combination of both may be configured or otherwise specially programmed to execute the operations or functionality of the asset and stream management system 206, the verification server 110, the record storage system 232, and the control unit 234, or various other components described herein. For example, the hardware processor 504, the non-transitory computer readable medium 506, or a combination of both may be configured or otherwise specially programmed to perform the operations and functionality of the asset and stream management system 206, the verification server 110, the record storage system 232, and the control unit 234 as described with respect to FIGS. 1, 2, 3A, 3B, 3C, 4A, and 4B.

The present disclosure may provide several advantages over the traditional systems for near real time verification of the playback of the one or more media assets with the programming media content. The bulk of the verification processes for verifying the playback of the one or more media assets is shared by the verification server 110. As the verification server 110 shares the bulk of processes instead of clogging resources of the client device 102, therefore, such configuration enables a network-bandwidth and memory efficient usage of communication network 114. The present disclosure renders a way to shift the verification process on the verification server 110 and thereby, minimizing the impact on power consumption, battery usage, or the availability of resources for other processes on the client device 102.

The verification of the playback of the media assets at the display view of the client device 102 renders a seamless viewing experience for the user 116 without diverting the attention of the user 116. The verification of the playback of the media assets at the client device 102 reduces a response time to adjust the one or more deviations with the playback of the media assets at the client device 102 with respect to the defined asset delivery criteria. The reduced response time further enhances selection of non-programming media assets, which in turn enhances user engagement with the media assets played at the playback time at the display view of the client device 102. The media assets are selected in a way that the assets may supplement a low interest during the playback of the programming media content at the client device 102. A likelihood of an engagement of the user associated with the client device 102 increases based on the targeted selection of the event opportunity points. Such targeted selection and presentation at the client device 102 further improves an attention span of the user for the media assets and therefore, a transient attention span of the user may be converted to a sustained attention span for the media assets. Such sustainability of attention span improves an audience churn rate or attrition rate for a given media network. The response over notifications may determine intent of the user with respect to the media assets and therefore, provide an efficient way to personalize such interests, and target the user 116 with different services that suit the user-preferences.

Various embodiments of the present disclosure may provide a system that may include a verification server that handles dynamic verification of playback of one or more media assets on a client device. The client device that handles playback of the one or more media assets onto a display view associated with the client device. The client device includes a first circuitry that may be configured to receive an asset stream of one or more media assets that comprises one or more tags embedded in the one or more media assets. The first circuitry of the client device may be configured to detect an asset identifier associated with each media asset of the one or more media assets during playback of each media asset on the client device, based on identification of a tag of the one or more tags. The client device may be configured to generate support information for each media asset, in response to the detection of the asset identifier, wherein the support information is generated for verification of the playback of each media asset at the client device. The verification server comprises a second circuitry configured to receive support information in response to the detection of the asset identifier at the client device. The second circuitry may be configured to verify the playback of the one or more media assets on the client device based on the received support information from the client device. The playback of the one or more media assets are verified to satisfy defined asset delivery criteria and to identify and debug at least one deviation or at least one error with the playback of the one or more media assets.

In accordance with an embodiment, the first circuitry is further configured to extract an asset public key from each media asset of the one or more media assets, wherein each media asset is associated with the asset public key. The first circuitry is further configured to generate a verification message for each media asset of the one or more media assets in response to the detection of the asset identifier for each media asset. The verification message for each media asset indicates that each media asset is present onto a display view of the client device. The verification message comprises the detected asset identifier associated with each media asset and a client public key that is associated with the client device.

In accordance with an embodiment, the first circuitry is further configured to encrypt the generated verification message for each media asset, by using a client private key associated with the client device and the extracted asset public key for each media asset. The generated support information comprises the encrypted verification message, the client public key, and the detected asset identifier for each media asset.

In accordance with an embodiment, the second circuitry is further configured to receive the encrypted verification message, the client public key, and the detected asset identifier for each media asset, from the client device, via a communication network. The second circuitry is further configured to search for an asset private key associated with each media asset for which the detected asset identifier is received from the client device.

In accordance with an embodiment, the second circuitry is further configured to decrypt the encrypted verification message based on the asset private key identified in the search. The decryption corresponds to the verification of the playback of each media asset. The second circuitry is further configured to generate confirmation information, in response to the decryption of the encrypted verification message for each media asset, to indicate an event of successful decryption of the encrypted verification message and a verification of the playback of each media asset at the client device.

In accordance with an embodiment, the second circuitry is further configured to generate a record that indicates that each media asset, for which the detected asset identifier is received from the client device, is presented at the client device. The second circuitry is further configured to encrypt the generated record using the asset private key identified based on the search and the client public key received with the encrypted message. The second circuitry is further configured to digitally sign the encrypted record using a server private key associated with the verification server to validate an authenticity of the generated record.

In accordance with an embodiment, the second circuitry is further configured to store the digitally signed record for each media asset in a database of records arranged in a sequence of verification units. The sequence of verification units corresponds to at least one of a blockchain of a plurality of blocks or other suitable distributed storage. Each block may include a cryptographic hash of a previous block of signed records.

In accordance with an embodiment, the first circuitry is further configured to construct representation information of the display view onto which the one or more media assets are presented on the client device, in response to the detection of the asset identifier for each media asset. The constructed representation information is at least one of a screenshot of the display view, a log of binary data in a display rasterization buffer on the client device, and a video clip or an audio clip that corresponds to a portion of each media asset. The first circuitry is further configured to generate a message that comprises the constructed representation information, the detected asset identifier, and a client public key associated with the client device. The generated support information, for each media asset, comprises the constructed representation information, the detected asset identifier, and the client public key.

In accordance with an embodiment, the second circuitry is further configured to receive the constructed representation information, the detected asset identifier, and the client public key, in response to the detection of the asset identifier for each media asset. Further, the second circuitry is further configured to analyze the constructed representation information to determine whether a display and a placement of each media asset in the constructed representation information matches the defined asset delivery criteria. Further, the second circuitry is further configured to validate the constructed representation information for each media asset, based on a match of the display and the placement of each media asset in the constructed representation information with the defined asset delivery criteria. The validation of the constructed representation information for each media asset corresponds to the verification of the playback of each media asset.

In accordance with an embodiment, the defined asset delivery criteria comprises a set of presentation attributes based on which each media asset is configured for presentation onto the display view of the client device. The set of presentation attributes comprises at least one of a display time, a display duration, a display frequency, a specified slot within a specified program of programming media content, a number of user interactions with a media asset, an enablement of a specific feature at a playback time of a media asset, a responsive display of a media asset for a user interaction, and a specified modification in the display view for a media asset.

In accordance with an embodiment, the at least one deviation or the at least one error with the playback of each media asset corresponds to at least a partial overlay, a color imbalance, an error with transition or overlay, an abrupt disappearance of a media asset from the display view, and a non-responsive playback of the at least one media asset.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs) and graphical processing units (GPUs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having one or more code sections executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   a verification server for dynamic verification of playback of one or more media assets; and
   a client device for playback of the one or more media assets on a display view of the client device,
   wherein the client device comprises a first circuitry that is configured to:
   receive an asset stream of the one or more media assets that comprises one or more tags embedded in the one or more media assets, via a communication network;
   detect an asset identifier associated with each media asset of the one or more media assets during playback of each media asset on the client device, based on identification of a tag of the one or more tags; and
   generate support information for each media asset, in response to the detection of the asset identifier,
   wherein the support information is generated for verification of the playback of each media asset at the client device, and
   generate a verification message for each media asset of the one or more media assets based on the detection of the asset identifier for each media asset,
   wherein the verification message for each media asset indicates that each media asset is presented on the display view of the client device;
   encrypt the generated verification message for each media asset, based on a client private key associated with the client device and an asset public key for each media asset; and
   wherein the verification server comprises a second circuitry that is configured to:
   verify the playback of the one or more media assets on the client device based on the verification message,
   wherein the playback of the one or more media assets are verified to satisfy a defined asset delivery criteria and to identify at least one deviation or at least one error with the playback of the one or more media assets.

2. The system according to claim 1, wherein the first circuitry is further configured to extract an asset public key from each media asset of the one or more media assets, and wherein each media asset is associated with the asset public key.

3. The system according to claim 1, wherein each tag of the one or more tags comprises information associated with an interactivity of an associated media asset of the one or more media assets at the display view of the client device.

4. The system according to claim 1, wherein the second circuitry is further configured to receive support information in response to the detection of the asset identifier at the client device; and
   wherein the generated support information comprises at least the encrypted verification message and the detected asset identifier for each media asset.

5. The system according to claim 1, wherein the second circuitry is further configured to:
   receive the encrypted verification message and the detected asset identifier for each media asset, from the client device, via the communication network; and
   search for an asset private key associated with each media asset for which the detected asset identifier is received from the client device.

6. The system according to claim 5, wherein the second circuitry is further configured to:
   decrypt the encrypted verification message based on the asset private key identified in the search, wherein the decryption corresponds to the verification of the playback of each media asset, and wherein the asset private key is identified based on the detected asset identifier from the support information; and
   generate confirmation information, in response to the decryption of the encrypted verification message for each media asset, to indicate an event of successful decryption of the encrypted verification message and a verification of the playback of each media asset at the client device.

7. The system according to claim 6, wherein the second circuitry is further configured to generate a record that indicates that each media asset, for which the detected asset identifier is received from the client device, is presented at the client device.

8. The system according to claim 7, wherein the second circuitry is further configured to:
encrypt the generated record using the asset private key, wherein the record includes the asset identifier; and
digitally sign the encrypted record using a server private key associated with the verification server to validate an authenticity of the generated record.

9. The system according to claim 8, wherein the second circuitry is further configured to store the digitally signed record for each media asset in a database of records arranged in a sequence of verification units.

10. The system according to claim 9, wherein the sequence of verification units corresponds to at least one of a database or blockchain of a plurality of blocks or a distributed data store, and wherein each block comprises a cryptographic hash of a previous block of signed records.

11. The system according to claim 1, wherein the first circuitry is further configured to construct representation information of the display view onto which the one or more media assets are presented on the client device, in response to the detection of the asset identifier for each media asset.

12. The system according to claim 11, wherein the constructed representation information is at least one of a screenshot of the display view, a log of binary data in a display rasterization buffer on the client device, or a video clip or an audio clip that corresponds to a portion of each media asset.

13. The system according to claim 11, wherein the first circuitry is further configured to generate a message that comprises the constructed representation information, the detected asset identifier, and a client public key associated with the client device.

14. The system according to claim 13, wherein the generated support information, for each media asset, comprises the constructed representation information, the detected asset identifier, and the client public key.

15. The system according to claim 13, wherein the second circuitry is further configured to:
receive the constructed representation information, the detected asset identifier, and the client public key, in response to the detection of the asset identifier for each media asset;
analyze the constructed representation information to determine whether a display and a placement of each media asset in the constructed representation information matches the defined asset delivery criteria; and
validate the constructed representation information for each media asset, based on a match of the display and the placement of each media asset in the constructed representation information with the defined asset delivery criteria, wherein the validation of the constructed representation information for each media asset corresponds to the verification of the playback of each media asset.

16. The system according to claim 15, wherein the defined asset delivery criteria comprises a set of presentation attributes based on which each media asset is configured for presentation onto the display view of the client device,
wherein the set of presentation attributes comprises at least one of a display time, a display duration, a display frequency, a specified slot within a specified program of programming media content, a number of user interactions with each media asset, an enablement of a specific feature at a playback time of each media asset, a responsive display of each media asset for a user interaction, or a specified modification in the display view for each media asset.

17. The system according to claim 1, wherein the at least one deviation or the at least one error with the playback of each media asset corresponds to at least one of a partial overlay, a color imbalance, an error with transition or overlay, an abrupt disappearance of a media asset from the display view, or a non-responsive playback of a media asset.

18. A method, comprising:
in a system that comprises a client device and a verification server:
receiving, by a first circuitry in the client device, an asset stream of one or more media assets that comprises one or more tags embedded in the one or more media assets, via a communication network;
detecting, by the first circuitry, an asset identifier associated with each media asset of the one or more media assets during playback of each media asset on the client device, based on identification of a tag of the one or more tags;
generating, by the first circuitry, support information for each media asset, in response to the detection of the asset identifier,
wherein the support information is generated for verification of the playback of each media asset at the client device;
generating a verification message for each media asset of the one or more media assets based on the detection of the asset identifier for each media asset,
wherein the verification message for each media asset indicates that each media asset is presented on a display view of the client device;
encrypting the generated verification message for each media asset, based on a client private key associated with the client device and an asset public key for each media asset; and
verifying, by a second circuitry of the verification server, the playback of the one or more media assets on the client device based on the verification message,
wherein the playback of the one or more media assets are verified to satisfy a defined asset delivery criteria and to identify at least one deviation or at least one error with the playback of the one or more media assets.

19. A system, comprising:
circuitry configured to:
receive support information based on a detection of an asset identifier at a client device,
wherein the client device detects the asset identifier associated with each media asset of one or more media assets during playback of each media asset on the client device, and
wherein the asset identifier is detected based on an identification of a tag embedded in the one or more media asset; and
verify the playback of the one or more media assets on the client device based on a verification message to satisfy a defined asset delivery criteria and to identify at least one deviation or at least one error with the playback of the one or more media assets, and
wherein the verification message for each media asset indicates that each media asset is presented on a display view of the client device,
wherein the client device generates the verification message for each media asset of the one or more media assets based on the detection of the asset identifier for each media asset, and
wherein the first circuitry encrypts the generated verification message for each media asset, based on a client private key associated with the client device and an asset public key for each media asset.

20. A system, comprising:
circuitry configured to:
receive support information based on a detection of an asset identifier at a client device,
wherein the client device detects the asset identifier associated with each media asset of one or more media assets during playback of each media asset on the client device,
wherein the asset identifier is detected based on an identification of a tag embedded in the one or more media asset, and
wherein each tag of the one or more tags comprises information associated with an interactivity of an associated media asset of the one or more media assets at a display view of the client device; and
verify the playback of the one or more media assets on the client device based on a verification message and the received support information from the client device,
wherein the client device extracts an asset public key from each media asset of the one or more media assets,
wherein the verification message comprises the detected asset identifier associated with each media asset and a client public key that is associated with the client device,
wherein the verification message for each media asset indicates that each media asset is presented on the display view of the client device,
wherein the verification message for each media asset is encrypted based on a client private key associated with the client device and an asset public key for each media asset, and
wherein the playback of the one or more media assets are verified to satisfy a defined asset delivery criteria and to identify at least one deviation or at least one error with the playback of the one or more media assets.

* * * * *